(12) United States Patent
Byun et al.

(10) Patent No.: US 11,676,571 B2
(45) Date of Patent: Jun. 13, 2023

(54) SYNTHESIZED SPEECH GENERATION

(71) Applicant: QUALCOMM Incorporated, San Diego, CA (US)

(72) Inventors: Kyungguen Byun, Seoul (KR);
Sunkuk Moon, San Diego, CA (US);
Shuhua Zhang, San Diego, CA (US);
Vahid Montazeri, San Diego, CA (US);
Lae-Hoon Kim, San Diego, CA (US);
Erik Visser, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 17/154,372

(22) Filed: Jan. 21, 2021

(65) Prior Publication Data
US 2022/0230623 A1    Jul. 21, 2022

(51) Int. Cl.
| | |
|---|---|
| *G10L 13/10* | (2013.01) |
| *G10L 13/06* | (2013.01) |
| *G10L 15/22* | (2006.01) |
| *G10L 13/00* | (2006.01) |
| *G10L 13/047* | (2013.01) |
| *G10L 13/033* | (2013.01) |
| *G10L 19/02* | (2013.01) |
| *G10L 25/63* | (2013.01) |

(Continued)

(52) U.S. Cl.
CPC .......... *G10L 13/047* (2013.01); *G06N 3/045* (2023.01); *G10L 13/033* (2013.01); *G10L 19/02* (2013.01); *G10L 25/63* (2013.01); *G10L 2021/0135* (2013.01)

(58) Field of Classification Search
CPC ......... G10L 13/10; G10L 25/18; G10L 13/06; G10L 15/22
See application file for complete search history.

(56) References Cited

U.S. PATENT DOCUMENTS

| | | | |
|---|---|---|---|
| 10,741,169 B1 * | 8/2020 | Trueba | ..................... G10L 13/10 |
| 2020/0034436 A1 | 1/2020 | Chen et al. | |
| 2020/0342852 A1 | 10/2020 | Kim et al. | |

(Continued)

FOREIGN PATENT DOCUMENTS

| | | | | |
|---|---|---|---|---|
| CN | 105390141 B | * | 10/2019 | ........... G10L 21/007 |
| CN | 111862953 A | * | 10/2020 | |

(Continued)

OTHER PUBLICATIONS

Alammar J., "The Illustrated Transformer", Visualizing Machine Learning One Concept at a Time, 2018, pp. 1-21, https://jalammar.github.io/illustrated-transformer/, received on Dec. 28, 2020.

(Continued)

*Primary Examiner* — Shreyans A Patel
(74) *Attorney, Agent, or Firm* — Qualcomm Incorporated

(57) ABSTRACT

A device for speech generation includes one or more processors configured to receive one or more control parameters indicating target speech characteristics. The one or more processors are also configured to process, using a multi-encoder, an input representation of speech based on the one or more control parameters to generate encoded data corresponding to an audio signal that represents a version of the speech based on the target speech characteristics.

30 Claims, 15 Drawing Sheets

(51) Int. Cl.
  *G06N 3/045* (2023.01)
  *G10L 21/013* (2013.01)

(56) References Cited

U.S. PATENT DOCUMENTS

2020/0394997 A1* 12/2020 Trueba .................... G10L 13/06
2022/0068257 A1*  3/2022 Biadsy .................... G10L 15/22
2022/0230623 A1*  7/2022 Byun ..................... G10L 13/047

FOREIGN PATENT DOCUMENTS

| CN | 112466316 A | * | 3/2021 | |
|---|---|---|---|---|
| CN | 112562728 A | * | 3/2021 | |
| EP | 3989217 A1 | * | 4/2022 | |
| KR | 102072162 B1 | * | 1/2018 | |
| KR | 20210052921 A | * | 11/2019 | |
| KR | 102072162 B1 | * | 1/2020 | |
| KR | 20210052921 A | * | 5/2021 | |
| WO | WO-2020027619 A1 | * | 2/2020 | ............. G06N 20/00 |

OTHER PUBLICATIONS

Li N., et al., "Neural Speech Synthesis with Transformer Network", Association for the Advancement of Artificial Intelligence, 2019, 8 Pages, arXiv:1809.08895v3 [cs.CL] (Jan. 30, 2019).
International Search Report and Written Opinion—PCT/US2021/072800—ISA/EPO—dated Mar. 30, 2022.
Sisman B., et al., "An Overview of Voice Conversion and its Challenges: From Statistical Modeling to Deep Learning", arxiv.org, Cornell University Library, 201 Olin Library Cornell University Ithaca, NY 14853, Nov. 17, 2020 (Nov. 17, 2020), XP081814065, 28 Pages, Abstract sec. v.
Songxiang L., et al., "End-To-End Accent Conversion Without Using Native Utterances", ICASSP 2020—2020 IEEE International Conference On Acoustics, Speech And Signal Processing (ICASSP), IEEE, May 4, 2020 (May 4, 2020), pp. 6289-6293, XP033793449, DOI: 10.1109/ICASSP40776.2020.9053797, [Retrieved on Apr. 1, 2020] Abstract, Figures 1, 2, 4 Sections 3, 4.1-4.3, 4.5 and 5.1.

* cited by examiner

SYNTHESIZED SPEECH GENERATION

I. FIELD

The present disclosure is generally related to synthesized speech generation.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to receive an audio signal from one or more microphones. For example, the audio signal may represent user speech captured by the microphones, external sounds captured by the microphones, or a combination thereof. Such devices may include applications that use speech models. For example, a voice-activated application recognizes user speech commands. Speech-based applications are trained using audio speech samples. Using a larger and more diverse data set of audio speech samples for training results in a more robust speech model. However, obtaining a large number of diverse audio speech samples from people can be time-consuming and inconvenient.

III. SUMMARY

According to one implementation of the present disclosure, a device for speech generation includes one or more processors configured to receive one or more control parameters indicating target speech characteristics. The one or more processors are also configured to process, using a multi-encoder, an input representation of speech based on the one or more control parameters to generate encoded data corresponding to an audio signal that represents a version of the speech based on the target speech characteristics.

According to another implementation of the present disclosure, a method of speech generation includes receiving, at a device, one or more control parameters indicating target speech characteristics. The method also includes processing, using a multi-encoder, an input representation of speech based on the one or more control parameters to generate encoded data corresponding to an audio signal that represents a version of the speech based on the target speech characteristics.

According to another implementation of the present disclosure, a non-transitory computer-readable medium stores instructions that, when executed by one or more processors, cause the one or more processors to receive one or more control parameters indicating target speech characteristics. The instructions, when executed by the one or more processors, also cause the one or more processors to process, using a multi-encoder, an input representation of speech based on the one or more control parameters to generate encoded data corresponding to an audio signal that represents a version of the speech based on the target speech characteristics.

According to another implementation of the present disclosure, an apparatus includes means for receiving one or more control parameters indicating target speech characteristics. The apparatus also includes means for processing, using a multi-encoder, an input representation of speech based on the one or more control parameters to generate encoded data corresponding to an audio signal that represents a version of the speech based on the target speech characteristics.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Using larger and more diverse data set of audio speech samples for training results in more robust speech models. Providing a large number of audio speech samples for speech training can be inconvenient and time-consuming for users. Systems and methods of synthetic speech generation are disclosed. For example, a speech generator receives (or accesses) an input representation (e.g., an audio signal, a video signal, text, etc.) of speech. The speech generator receives control parameters indicating target speech characteristics, such as a target emotion (e.g., neutral, happy, sad, etc.), a target rate of speech (e.g., slow, medium, or fast), a target person whose speech characteristics are to be used (e.g., a user, a celebrity, a child with a particular accent, etc.), or a combination thereof. The speech generator includes a multi-encoder, such as in a multi-encoder transformer, that processes the input representation based on the control parameters to generate encoded data based on the target speech characteristics and a decoder that generates an audio signal (e.g., a synthetic speech signal) by decoding the encoded data. The speech generator can generate a diverse set of synthetic audio samples by applying various sets of control parameters to the same input representation.

Figure 1:
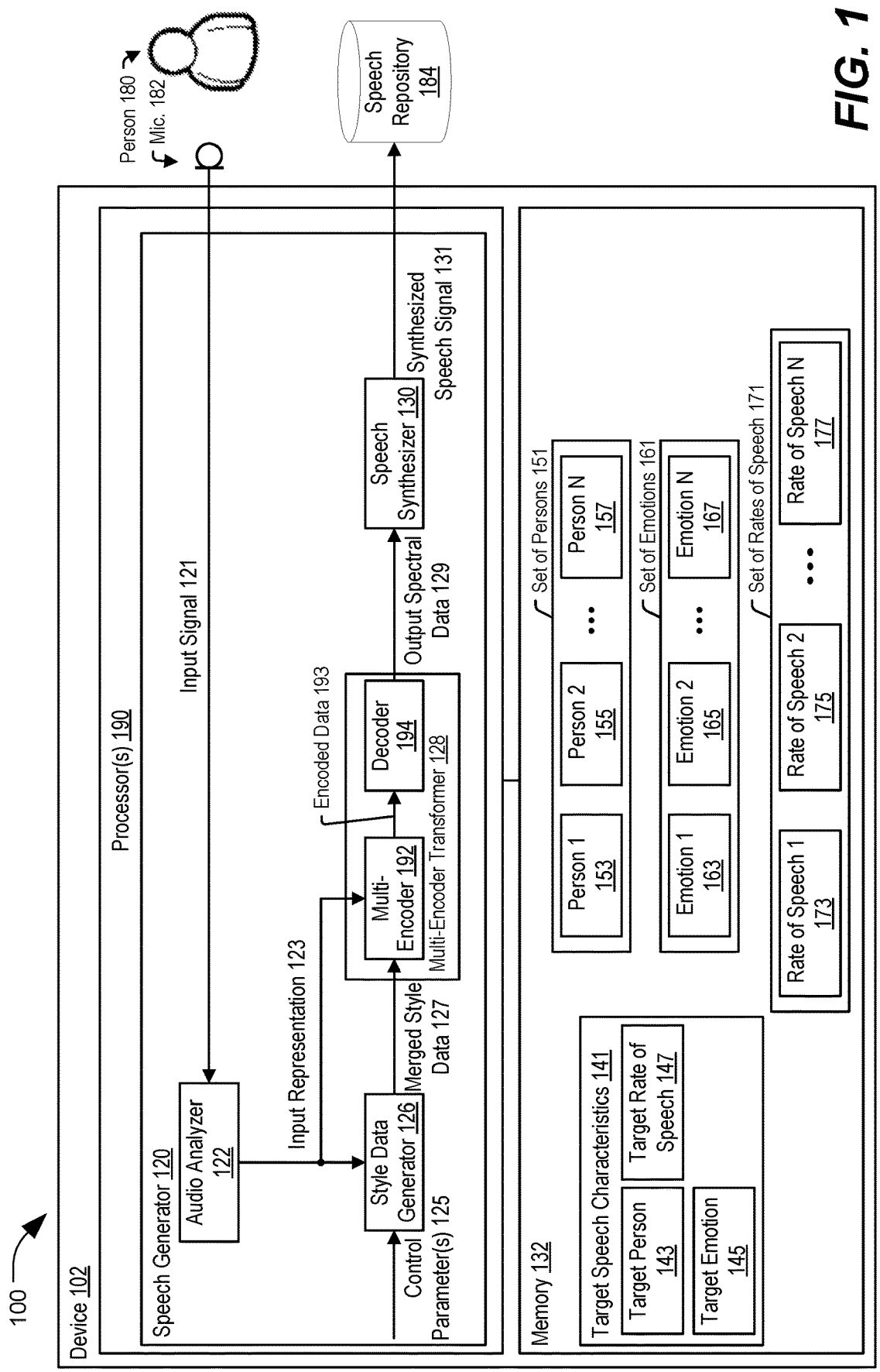
FIG. 1 is a block diagram of a particular illustrative aspect of a system operable to generate synthesized speech, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 190 of FIG. 1), which indicates that in some implementations the device 102 includes a single processor 190 and in other implementations the device 102 includes multiple processors 190. For ease of reference herein, such features are generally introduced as "one or more" features and are subsequently referred to in the singular unless aspects related to multiple of the features are being described.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system configured to generate synthesized speech is disclosed and generally designated 100. The system 100 includes a device 102 that is configured to generate synthetic speech using a speech generator 120. The device 102 includes one or more processors 190 coupled to a memory 132. The one or more processors 190 include the speech generator 120. In some implementations, the device 102 is coupled to a microphone 182, a speech repository 184, or both. In a particular implementation, the microphone 182, the speech repository 184, or both are external to the device 102. In an alternative implementation, the microphone 182, the speech repository 184, or both are integrated in the device 102.

The speech generator 120 includes an audio analyzer 122, a style data generator 126, a multi-encoder transformer 128, a speech synthesizer 130, or a combination thereof. In a particular aspect, the audio analyzer 122 is coupled to the style data generator 126, the multi-encoder transformer 128, or both. The style data generator 126 is coupled via the multi-encoder transformer 128 to the speech synthesizer 130. In a particular aspect, the speech synthesizer 130 is coupled to the speech repository 184.

The audio analyzer 122 is configured to process an input signal 121 to generate an input representation 123 of speech. In a particular example, the input signal 121 includes an audio signal, e.g., received via the microphone 182 or retrieved from a storage device. In another example, the input signal 121 includes a video signal that indicates audio information and image information. The input representation 123 includes text, mel-scale spectrograms, fundamental frequency (F0) features, one or more other representations of speech, or a combination thereof, based on the input signal 121. In a particular example, the audio analyzer 122 is configured to perform feature extraction to generate mel-scale spectrograms, fundamental frequency (F0) features, or a combination thereof, as the input representation 123. In a particular example, the audio analyzer 122 is configured to perform speech-to-text conversion on the input signal 121 to generate text as the input representation 123.

The style data generator 126 is configured to generate merged style data 127 based on the input representation 123 and one or more control parameters 125, as further described with reference to FIG. 2. The one or more control parameters 125 indicate one or more target speech characteristics 141. For example, the target speech characteristics 141 indicate a target person 143 (e.g., a person 180), a target emotion 145 (e.g., happy, angry, excited, sad, or neutral emotion), a target rate of speech 147 (e.g., medium rate of speech), or a combination thereof. In a particular aspect, the merged style data 127 corresponds to an embedding (e.g., an embedding vector) that represents the input representation 123 and the one or more control parameters 125.

The multi-encoder transformer 128 is configured to process the input representation 123 and the merged style data 127 to generate output spectral data 129, as further described with reference to FIGS. 4A-5. The multi-encoder transformer 128 includes a multi-encoder 192 and a decoder 194. The multi-encoder 192 is configured process the input representation 123 based on the one or more control parameters 125 to generate encoded data 193 corresponding to the synthesized speech signal 131. For example, the synthesized speech signal 131 is based on the encoded data 193. In a particular aspect, the multi-encoder 192 includes a first encoder configured to process the input representation 123 independently of the one or more control parameters 125 (e.g., independently of the target speech characteristics 141) to generate first encoded data, as further described with reference to FIG. 4A. The multi-encoder 192 includes one or more second encoders configured to process the merged style data 127 (that is based on the one or more control parameters 125) to generate second encoded data, as further described with reference to FIGS. 4A-4B. The second encoded data is thus based on the one or more control parameters 125 (e.g., the target speech characteristics 141). The decoder 194 is configured to generate the output spectral data 129 based on the encoded data 193 (e.g., the first encoded data and the second encoded data), as further described with reference to FIGS. 4A-4B. The speech synthesizer 130 is configured to perform speech synthesis on the output spectral data 129 to generate the synthesized speech signal 131 that represents the version of the speech (e.g., indicated by the input representation 123) based on the target speech characteristics 141.

The memory 132 is configured to store data used or generated by the speech generator 120. For example, the memory 132 is configured to store at least a portion of the input signal 121, the input representation 123, the one or more control parameters 125, the merged style data 127, the encoded data 193, the output spectral data 129, at least a portion of the synthesized speech signal 131, or a combination thereof. In a particular aspect, the memory 132 stores mapping data indicating a mapping between the one or more control parameters 125 and the target speech characteristics 141. For example, the mapping data indicates first mappings between values of a first control parameter of the one or more control parameters 125 and the set of persons 151, second mappings between values of a second control parameter of the one or more control parameters 125 and the set of emotions 161, third mappings between values of a third control parameter of the one or more control parameters 125 and the set of rates of speech 171, or a combination thereof. The style data generator 126 determines that the one or more control parameters 125 indicate the target person 143 in response to determining that the mapping data indicates that a value of the first control parameter indicated by the one or more control parameters 125 maps to the target person 143 of the set of persons 151. Similarly, the style data generator 126 determines that the one or more control parameters 125 indicate the target emotion 145 in response to determining that the mapping data indicates that a value of the second control parameter indicated by the one or more control parameters 125 maps to the target emotion 145 of the set of emotions 161. The style data generator 126 determines that the one or more control parameters 125 indicate the target rate of speech 147 in response to determining that the mapping data indicates that a value of the third control parameter indicated by the one or more control parameters 125 maps to the target rate of speech 147 of the set of rates of speech 171.

In some implementations, the device 102 corresponds to or is included in one or various types of devices. In an illustrative example, the one or more processors 190 are integrated in a headset device that includes the microphone 182, such as described further with reference to FIG. 10. In other examples, the one or more processors 190 are integrated in at least one of a mobile phone or a tablet computer device, as described with reference to FIG. 9, a wearable electronic device, as described with reference to FIG. 11, a voice-controlled speaker system, as described with reference to FIG. 12, a camera device, as described with reference to FIG. 13, or a virtual reality, augmented reality, or mixed reality headset, as described with reference to FIG. 14. In another illustrative example, the one or more processors 190 are integrated into a vehicle that also includes the microphone 182, such as described further with reference to FIG. 15 and FIG. 16.

During operation, the audio analyzer 122 receives an input signal 121 via the microphone 182. For example, the microphone 182 captures speech (e.g., "unlock the door") of the person 180 and provides the input signal 121 representing the speech to the audio analyzer 122. The speech (e.g., "unlock the door") represented by the input signal 121 has a particular rate of speech (e.g., a fast rate of speech) and a particular emotion (e.g., anxious).

The audio analyzer 122 generates an input representation 123 of the input signal 121. For example, the audio analyzer 122 performs speech-to-text conversion on the input signal 121 to generate text (e.g., "unlock the door"). As another example, the audio analyzer 122 performs audio feature extraction on the input signal 121 to generate mel-scale spectrograms, fundamental frequency (F0) features, or a combination thereof. The input representation 123 includes the text (e.g., "unlock the door"), the mel-scale spectrograms, the fundamental frequency (F0) features, or a combination thereof.

The device 102 receives or accesses one or more control parameters 125. In a particular aspect, the one or more control parameters 125 are based on default data, a configuration setting, a user input, or a combination thereof. The one or more control parameters 125 indicate target speech characteristics 141 of synthesized speech to be generated by the speech generator 120.

In a particular aspect, the target speech characteristics 141 indicate a target person 143 (e.g., the person 180) of a set of persons 151. The set of persons 151 includes a first person (person 1) 153, a second person (person 2) 155, one or more additional persons, such as an Nth person (person N) 157, or a combination thereof. In an illustrative, non-limiting example, the set of persons 151 includes a particular celebrity, a particular user, a person having a particular accent, a person of a particular age, a person of a particular gender, or a combination thereof. Speech characteristics of the target person 143 are to be used by the speech generator 120 to generate synthesized speech. In a particular example, the target person 143 indicates "President Obama." In another example, the target person 143 indicates "a middle-aged male with a Texas accent." In a particular example, the target person 143 indicates the person 180.

In a particular aspect, the target speech characteristics 141 indicate a target emotion 145 (e.g., neutral) selected from a set of emotions 161. The set of emotions 161 includes a first emotion (emotion 1) 163, a second emotion (emotion 2) 165, one or more additional emotions, such as an Nth emotion (emotion N) 167, or a combination thereof. In an illustrative, non-limiting example, the set of emotions 161 includes happiness, fear, anxiety, excitement, anger, calm, neutral, or a combination thereof.

In a particular aspect, the target speech characteristics 141 indicate a target rate of speech 147 (e.g., a medium rate of speech) selected from a set of rates of speech 171. The set of rates of speech 171 includes a first rate of speech (rate of speech 1) 173, a second rate of speech (rate of speech 2) 175, one or more additional rates of speech, such as an Nth rate of speech (rate of speech N) 177, or a combination thereof. In an illustrative, non-limiting example, the set of rates of speech 171 includes a slow rate of speech, a medium rate of speech, a fast rate of speech, or a combination thereof.

The style data generator 126 generates merged style data 127 based on the input representation 123 and the one or more control parameters 125, as further described with reference to FIG. 2. For example, the merged style data 127 corresponds to an embedding (e.g., an embedding vector) that represents the input representation 123 and the one or more control parameters 125.

The multi-encoder transformer 128 processes the input representation 123 and the merged style data 127 to generate output spectral data 129, as further described with reference to FIGS. 4A-4B. For example, a first encoder of the multi-encoder 192 processes the input representation 123 independently of the one or more control parameters 125 (e.g., independently of the target speech characteristics 141) to generate first encoded data, as further described with reference to FIG. 4A. One or more second encoders of the multi-encoder 192 process the merged style data 127 to generate second encoded data, as further described with reference to FIGS. 4A-4B.

In a particular aspect, the merged style data 127 is used by the multi-encoder 192 during processing of the input representation 123. For example, the one or more second encoders process the merged style data 127 concurrently with the first encoder processing the input representation 123. The multi-encoder 192 provides encoded data 193 (e.g., the first encoded data, the second encoded data, or a combination thereof) to the decoder 194. In a particular aspect, the encoded data 193 corresponds to an output embedding (e.g., an embedding vector) of the multi-encoder 192.

The decoder 194 processes the encoded data 193 (e.g., the first encoded and the second encoded data) to generate the output spectral data 129, as further described with reference to FIG. 4A. The speech synthesizer 130 performs speech synthesis on the output spectral data 129 to generate a synthesized speech signal 131. The synthesized speech signal 131 corresponds to a version of the speech indicated by the input representation 123 that is based on the target speech characteristics 141.

The multi-encoder 192 and the decoder 194 are described as included in the multi-encoder transformer 128 as an illustrative example. In some examples, the multi-encoder 192 and the decoder 194 have a configuration other than a transformer.

Having the one or more second encoders in the multi-encoder 192 for the one or more control parameters 125 (and that are separate from the first encoder that is independent of the one or more control parameters 125) enables the second encoders to be trained (e.g., optimized) specifically for encoding input representations 123 based on each of the one or more control parameters 125, as further described with reference to FIG. 3.

In a particular example, the synthesized speech signal 131 has the target speech characteristics 141. In a particular example, the synthesized speech signal 131 is closer (as compared to the input signal 121) to having the target speech characteristics 141. In a particular aspect, the speech generator 120 includes an adjuster that is configured to adjust configuration parameters (e.g., neural network weights) of the multi-encoder transformer 128 based on a comparison of the one or more control parameters 125 and estimated control parameters corresponding to the synthesized speech signal 131, as further described with reference to FIG. 3. The speech generator 120 can thus dynamically train the multi-encoder transformer 128 to improve accuracy of the synthetic speech generation.

The device 102 is described as receiving the input signal 121 and generating the input representation 123 based on the input signal 121 as an illustrative example. For example, each of the style data generator 126 and the multi-encoder transformer 128 receives the input representation 123 from the audio analyzer 122. In some examples, the device 102 receives the input representation 123 (e.g., instead of the input signal 121). For example, the device 102 (e.g., each of the multi-encoder transformer 128 and the style data generator 126) receives the input representation 123 as input from the person 180, from another device, or both.

In an illustrative example, the input representation 123 corresponds to speech of the person 180 having a particular emotion (e.g., anxious) and a particular rate of speech (e.g., a high rate of speech). The synthesized speech signal 131 corresponds to speech of the target person 143 (e.g., the person 180) having the target emotion 145 (e.g., neutral) and the target rate of speech 147 (e.g., a medium rate of speech). In this example, performing speech recognition on the synthesized speech signal 131 (e.g., neutral speech having a medium rate of speech) improves recognition accuracy as compared to performing speech recognition on the input signal 121 (e.g., anxious speech having a high rate of speech).

In a particular aspect, the speech generator 120 adds the synthesized speech signal 131 to the speech repository 184. For example, the speech generator 120 generates (or updates) a training dataset based on the input signal 121, as further described with reference to FIG. 6. To illustrate, the speech generator 120 generates a first synthesized speech signal 131 based on a first set of the one or more control parameters 125, a second synthesized speech signal 131 based on a second set of the one or more control parameters 125, one or more additional synthesized speech signals 131 based on one or more additional sets of the one or more control parameters 125, or a combination thereof. The speech generator 120 adds the input signal 121, the first synthesized speech signal 131, the second synthesized speech signal 131, the one or more additional synthesized speech signals 131, or a combination thereof, to the training dataset in the speech repository 184.

In a particular example, the speech generator 120 generates multiple synthesized speech signals corresponding to various emotions and rates of speech based on the same input signal 121. In this example, the synthesized speech signals can be used to train a robust speech model (e.g., a neural network) that represents speech of the person 180 using a few words spoken by the person 180. To illustrate, during enrollment, speech of the person 180 (e.g., enrollment speech) having particular speech characteristics (e.g., neutral speech with a medium rate of speech) is received as the input signal 121 for training the neural network. Training the neural network based on the synthesized speech corresponding to various speech characteristics enables the neural network to recognize speech having different speech characteristics (e.g., anxious speech with a fast rate of speech) than the speech characteristics (e.g., neutral speech with a medium rate of speech) of the enrollment speech.

In a particular example, the speech generator 120 generates multiple synthesized speech signals corresponding to various emotions, various rates of speech, and speech characteristics of various persons based on the same input signal 121. In this example, a large and diverse synthesized speech dataset can be generated using a few words spoken by the person 180.

Although the microphone 182 is illustrated as being coupled to the device 102, in other implementations the microphone 182 may be integrated in the device 102. Although one microphone 182 is illustrated, in other implementations one or more additional microphones configured to capture user speech may be included. In some implementations, the microphone 182 is omitted, such as when the speech generator 120 retrieves the input signal 121 or the input representation 123 from storage (e.g., as text data retrieved from the memory 132 or received from another device). Although the system 100 is illustrated as including all components of the speech generator 120 in the device 102, in other implementations a second device may be added, and the second device may perform some of the operations described as being performed at the device 102.

Figure 2:
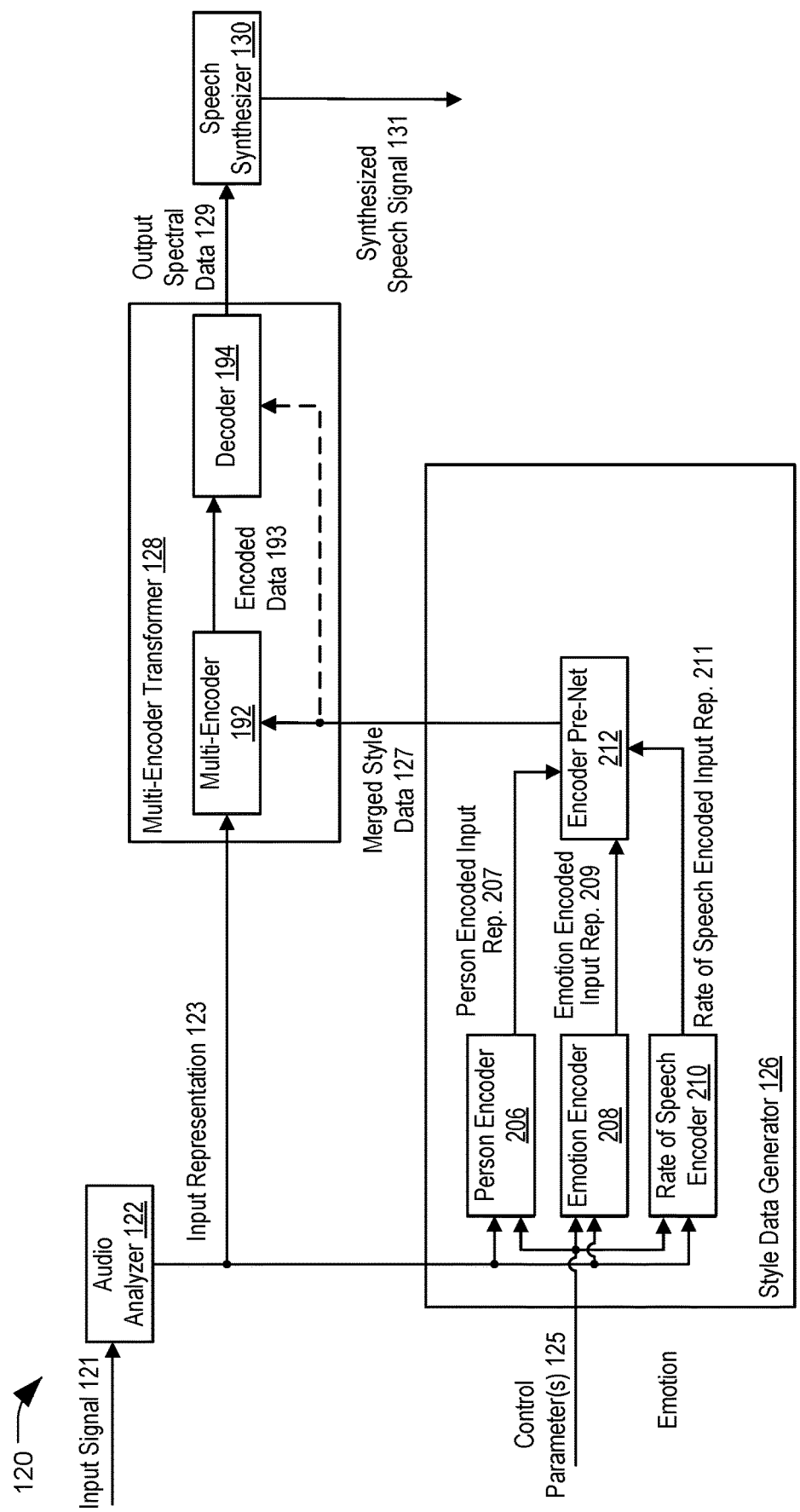
FIG. 2 is a diagram of a particular implementation of a speech generator of the system of FIG. 1, in accordance with some examples of the present disclosure.

Referring to FIG. 2, a particular implementation of the speech generator 120 is shown. The style data generator 126 includes a plurality of speech characteristic encoders, such as a person encoder 206, an emotion encoder 208, a rate of speech encoder 210, one or more additional speech characteristic encoders, or a combination thereof.

In a particular aspect, the audio analyzer 122 is coupled to each of the plurality of speech characteristic encoders. Each of the plurality of speech characteristic encoders is coupled to an encoder pre-net 212. Each of the plurality of speech characteristic encoders is configured to generate an encoded version of the input representation 123 based on a corresponding speech characteristic indicated by the one or more control parameters 125. For example, the person encoder 206 is configured to process the input representation 123 and a person control parameter (e.g., indicating the target person 143) of the one or more control parameters 125 to generate a person encoded input representation 207. To illustrate, the person encoder 206 includes a neural network (e.g., a convolutional neural network (CNN)) that is configured to receive the input representation 123 and the person control parameter (e.g., indicating the target person 143) as inputs and to output the person encoded input representation 207 (e.g., an embedding vector) representing the input representation 123 and the person control parameter.

Similarly, the emotion encoder 208 is configured to process the input representation 123 and an emotion control parameter (e.g., indicating the target emotion 145) of the one or more control parameters 125 to generate an emotion encoded input representation 209. In a particular example, the rate of speech encoder 210 is configured to process the input representation 123 and a rate of speech parameter (e.g., indicating the target rate of speech 147) of the one or more control parameters 125 to generate a rate of speech encoded input representation 211.

The encoder pre-net 212 includes a neural network (e.g., a CNN), a linear projection layer, or both. In a particular example, the person encoded input representation 207, the emotion encoded input representation 209, the rate of speech encoded input representation 211, or a combination thereof, correspond to an input embedding of the neural network (e.g., a CNN). The neural network of the encoder pre-net 212 processes the input embedding (e.g., an encoded input representation) to generate an output embedding. The neural network provides the output embedding to the linear projection layer and the linear projection layer generates the merged style data 127 by performing a linear projection on the output embedding of the neural network. In a particular aspect, the multi-encoder transformer 128 does not include any convolution, and convolution is performed via use of the encoder pre-net 212 to process the person encoded input representation 207, the emotion encoded input representation 209, the rate of speech encoded input representation 211, or a combination thereof. The encoder pre-net 212 provides the merged style data 127 to the multi-encoder 192.

The multi-encoder 192 receives the input representation 123 from the audio analyzer 122 and the merged style data 127 from the style data generator 126. The multi-encoder 192 processes the input representation 123 and the merged style data 127 to generate the encoded data 193. For example, the multi-encoder 192 processes the input representation 123 to generate first encoded data independent of the target speech characteristics 141 of FIG. 1, and processes the merged style data 127 to generate second encoded data corresponding to the target speech characteristics 141 of FIG. 1, as further described with reference to FIGS. 4A-4B. In a particular aspect, the encoder pre-net 212 also provides the merged style data 127 to the decoder 194. In this aspect, the decoder 194 processes the encoded data 193 based on the merged style data 127 to generate the output spectral data 129.

Figure 3:
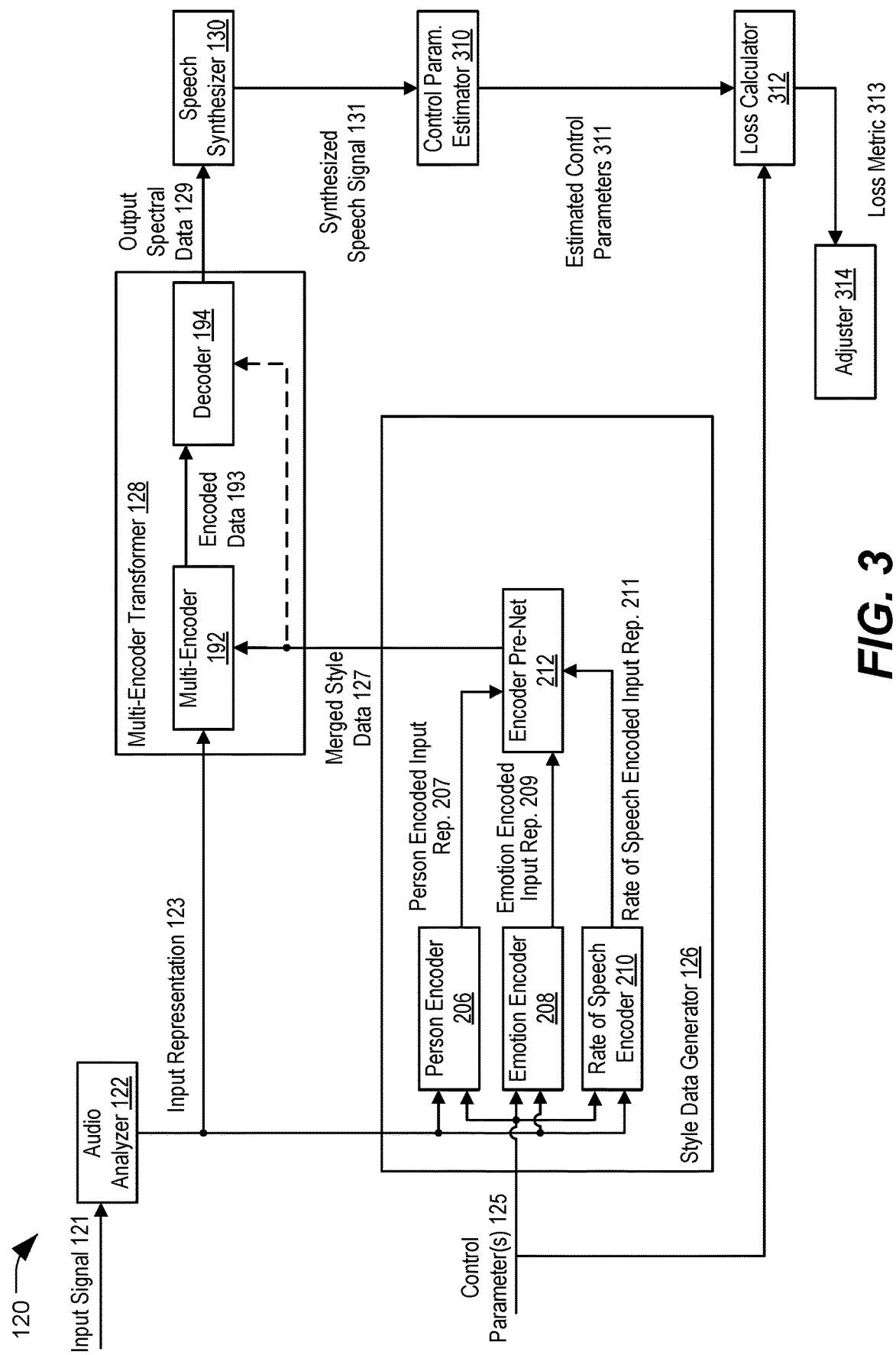
FIG. 3 is a diagram of another particular implementation of the speech generator of FIG. 1, in accordance with some examples of the present disclosure.

Referring to FIG. 3, a particular implementation of the speech generator 120 is shown in which the speech synthesizer 130 is coupled, via a control parameter estimator 310 and a loss calculator 312, to an adjuster 314.

The control parameter estimator 310 processes the synthesized speech signal 131 to generate one or more estimated control parameters 311. For example, the control parameter estimator 310 determines an estimated person, an estimated emotion, an estimated rate of speech, or a combination thereof, corresponding to the synthesized speech signal 131.

In a particular example, the control parameter estimator 310 generates model match scores by comparing the synthesized speech signal 131 to speech models associated with each of the set of persons 151 of FIG. 1. The control parameter estimator 310 selects a model match score (e.g., a highest match score) from the model match scores that corresponds to a particular speech model that most closely matches the synthesized speech signal 131. The control parameter estimator 310, in response to determining that the particular speech model represents speech of a particular person, generates the one or more estimated control parameters 311 indicating the particular person as the estimated person.

In a particular aspect, the control parameter estimator 310 uses emotion detection techniques to detect the estimated emotion indicated by the synthesized speech signal 131. For example, the control parameter estimator 310 includes a neural network that is configured to process an input embedding representing the synthesized speech signal 131 to generate an output (e.g., a classifier output or an embedding) representing the estimated emotion.

In a particular aspect, the control parameter estimator 310 uses audio analysis techniques to determine an average (e.g., mean, median, or mode) rate of speech detected in the synthesized speech signal 131 and generates the one or more estimated control parameters 311 indicating the average rate of speech as the estimated rate of speech. The control parameter estimator 310 provides the one or more estimated control parameters 311 to the loss calculator 312.

The loss calculator 312 generates a loss metric 313 based on a comparison of the one or more control parameters 125 and the estimated control parameters 311. For example, the loss metric 313 includes a person loss metric, an emotion loss metric, a rate of speech loss metric, or a combination thereof.

In a particular aspect, the target person 143 is represented by a first person embedding vector in a vector space, and the estimated person is represented by a second person embedding vector in the vector space. For example, dimensions of the vector space represent various speech characteristics (e.g., pitch, tone, etc.). The control parameter estimator 310 determines the person loss metric based on a vector distance between the first person embedding vector and the second person embedding vector.

In a particular aspect, the target emotion 145 is represented by a first emotion embedding vector in a vector space, and the estimated emotion is represented by a second emotion embedding vector in the vector space. For example, the vector space represents an emotion chart. The control parameter estimator 310 determines the emotion loss metric based on a vector distance between the first emotion embedding vector and the second emotion embedding vector.

In a particular aspect, the control parameter estimator 310 determines the rate of speed loss metric based on a difference between the target rate of speech 147 and the estimated rate of speed (e.g., rate of speed loss metric=the target rate of speech 147 minus the estimated rate of speech).

The loss calculator 312 provides the loss metric 313 (e.g., the person loss metric, the emotion loss metric, the rate of speech loss metric, or a combination thereof) to the adjuster 314. The adjuster 314, in response to determining that the loss metric 313 indicates a loss that is greater than a loss threshold, uses machine learning (e.g., neural network training) techniques to train one or more configuration parameters (e.g., neural network weights) of the multi-encoder 192, the person encoder 206, the emotion encoder 208, the rate of speech encoder 210, the encoder pre-net 212, a decoder network of the decoder 194, or a combination thereof, to reduce the loss metric 313 for subsequent processing of input representations.

Figure 4A:
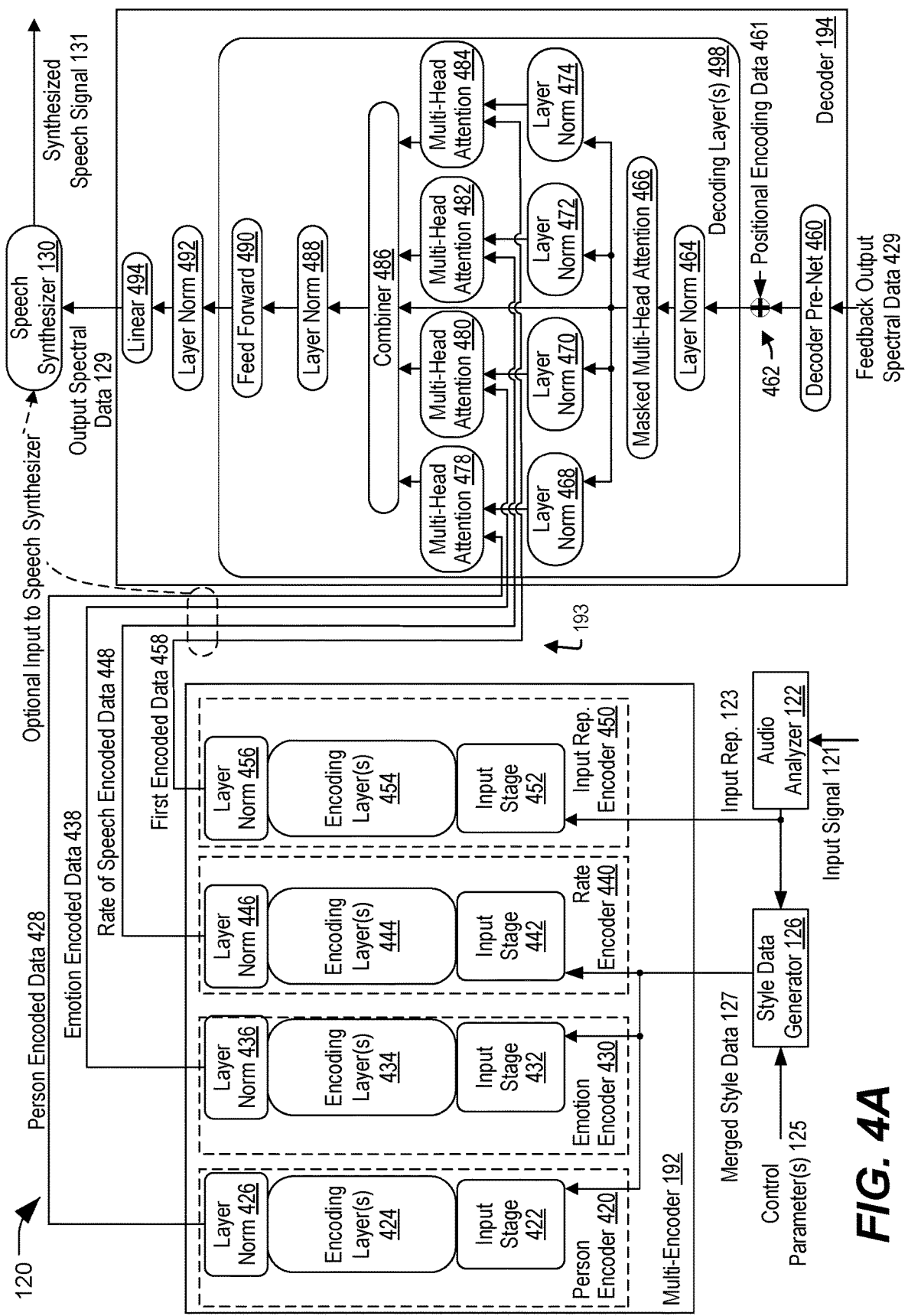
FIG. 4A is a diagram of another particular implementation of the speech generator of FIG. 1, in accordance with some examples of the present disclosure.

In a particular aspect, the adjuster 314, in response to determining that the person loss metric indicates a loss that is greater than a person loss threshold, trains configuration parameters (e.g., neural network weights) of the person encoder 206, the encoder pre-net 212, a person encoder 420, a masked multi-head attention 466, a multi-head attention 478 of FIG. 4A, or a combination thereof.

In a particular aspect, the adjuster 314, in response to determining that the emotion loss metric indicates a loss that is greater than an emotion loss threshold, trains configuration parameters (e.g., neural network weights) of the emotion encoder 208, the encoder pre-net 212, an emotion encoder 430, the masked multi-head attention 466, a multi-head attention 480 of FIG. 4A, or a combination thereof.

In a particular aspect, the adjuster 314, in response to determining that the rate of speech loss metric indicates a loss that is greater than a rate of speech loss threshold, trains configuration parameters (e.g., neural network weights) of the rate of speech encoder 210, the encoder pre-net 212, a rate encoder 440, the masked multi-head attention 466, a multi-head attention 482 of FIG. 4A, or a combination thereof.

The adjuster 314 thus enables training of the speech generator 120 to improve accuracy of synthetic speech generation in matching the target speech characteristics 141. For example, configuration parameters (e.g., neural network weights) of the speech generator 120 can be automatically tuned by the adjuster 314 independently of user input to improve accuracy of the synthetic speech generation.

Referring to FIG. 4A, a particular implementation of the speech generator 120 is shown. The multi-encoder 192 includes an input representation encoder 450 and a speech characteristic encoder for each speech characteristic. For example, the multi-encoder 192 includes the person encoder 420, the emotion encoder 430, the rate encoder 440, or a combination thereof.

Each encoder of the multi-encoder 192 is configured to generate encoded data by processing input data, as further described with reference to FIG. 5, independently of the other encoders of the multi-encoder 192. For example, the input representation encoder 450 is configured to process the input representation 123 to generate first encoded data 458. The person encoder 420 is configured to process the merged style data 127 to generate person encoded data 428. The emotion encoder 430 is configured to process the merged style data 127 to generate emotion encoded data 438. The rate encoder 440 is configured to process the merged style data 127 to generate rate of speech encoded data 448. Since each of the encoders of the multi-encoder 192 operates independently of the other encoders of the multi-encoder 192, each of the encoders can be specifically tuned by the adjuster 314 based on a corresponding speech characteristic loss metric to improve accuracy of the synthesized speech generation, as described with reference to FIG. 3.

Each encoder of the multi-encoder 192 includes an input stage, one or more encoding layers, and a normalization layer (layer norm), as further described with reference to FIG. 5. For example, the input representation encoder 450 includes an input stage 452, one or more encoding layers 454, and a layer norm 456. The person encoder 420 includes an input stage 422, one or more encoding layers 424, and a layer norm 426. The emotion encoder 430 includes an input stage 432, one or more encoding layers 434, and a layer norm 436. The rate encoder 440 includes an input stage 442, one or more encoding layers 444, and a layer norm 446.

In some implementations, each of the encoders 420, 430, 440, and 450 are configured and operate as described with reference to an encoder 500 depicted in FIG. 5. In FIG. 5, the encoder 500 includes an input stage 522, one or more encoding layers 554, and a layer norm 526. Each encoding layer of the one or more encoding layers 554 includes an attention layer and a feed forward layer. The attention layer includes an attention network, such as a multi-head attention 564. The feed forward layer includes a feed forward neural network, such as a feed forward 570 (e.g., a fully connected feed forward neural network). In a particular example, the attention layer includes a layer norm 562 coupled via the multi-head attention 564 to a combiner 566. The feed forward layer includes a layer norm 568 coupled via the feed forward 570 to a combiner 572. The attention layer is coupled to the feed forward layer. For example, the combiner 566 is coupled to the layer norm 568 and to the combiner 572.

The one or more encoding layers 554 including a single encoding layer is provided as an illustrative example. In other examples, the one or more encoding layers 554 include multiple encoding layers with an output of the input stage 522 coupled to the attention layer (e.g., the layer norm 562) of an initial encoding layer, the feed forward layer (e.g., the combiner 572) of each previous encoding layer coupled to the attention layer (e.g., the layer norm 562) of a subsequent encoding layer, and the feed forward layer (e.g., the combiner 572) of a last encoding layer coupled to the layer norm 526.

The input stage 522 receives input data 521. In a particular example, the encoder 500 corresponds to the input representation encoder 450 of FIG. 4. For example, the input data 521 corresponds to the input representation 123, the input stage 522 corresponds to the input stage 452, the one or more encoding layers 554 correspond to the one or more encoding layers 454, and the layer norm 526 corresponds to the layer norm 456. In a particular implementation, the input stage 452 includes an encoder pre-net (e.g., a CNN, a linear projection layer, or both) that processes the input representation 123 to generate an output. For example, the encoder pre-net of the input representation encoder 450 is used to add convolution. The input stage 452 is configured to process an output of the encoder pre-net. For example, the input stage 452 is configured to generate an output by combining the output of the encoder pre-net with positional encoding data.

In a particular aspect, the encoder 500 corresponds to the person encoder 420, the emotion encoder 430, or the rate encoder 440, the input data 521 corresponds to the merged style data 127, and the input stage 522 is configured to generate an output by processing the merged style data 127. For example, the input stage 522 is configured to generate an output by combining the merged style data 127 with positional encoding data.

In a particular example, the encoder 500 corresponds to the person encoder 420. To illustrate, the input stage 522 corresponds to the input stage 422, the one or more encoding layers 554 correspond to the one or more encoding layers 424, and the layer norm 526 corresponds to the layer norm 426. In a particular example, the encoder 500 corresponds to the emotion encoder 430. To illustrate, the input stage 522 corresponds to the input stage 432, the one or more encoding layers 554 correspond to the one or more encoding layers 434, and the layer norm 526 corresponds to the layer norm 436. In a particular example, the encoder 500 corresponds to the rate encoder 440. To illustrate, the input stage 522 corresponds to the input stage 442, the one or more encoding layers 554 correspond to the one or more encoding layers 444, and the layer norm 526 corresponds to the layer norm 446.

The output of the input stage 522 is provided, subsequent to normalization by the layer norm 562, to the multi-head attention 564. The multi-head attention 564 can build a context vector from different aspects using different attention heads. For example, the multi-head attention 564 includes attention heads that process the input to the multi-head attention 564 in parallel. To illustrate, the input is multiplied by a first matrix, a second matrix, and a third matrix to generate a first Query vector, a first Key vector, and a first Value vector, respectively. The first Query vector, the first Key vector, and the first Value vector are processed by a first attention head. The input is multiplied by a fourth matrix, a fifth matrix, and a sixth matrix to generate a second Query vector, a second Key vector, and a second Value vector, respectively. The second Query vector, the second Key vector, and the second Value vector are processed by a second attention head in parallel or concurrently with the first attention head processing the first Query vector, the first Key vector, and the first Value vector.

In a particular aspect, an output of an attention head corresponds to the following Equation:

$$Z = softmax\left(\frac{Q x K^T}{\sqrt{d_k}}\right)V,$$

where Z corresponds to an output of the attention head, Q corresponds to the Query vector, x corresponds to the multiplication operator, K corresponds to the Key vector, V corresponds to the Value vector, $d_k$ corresponds to the dimension of the Key vectors, and softmax corresponds to a normalization operation.

The independent outputs of the attention heads are concatenated and linearly transformed to generate an output of the multi-head attention 564. The combiner 566 generates an output by combining the input to the layer norm 562 and the output of the multi-head attention 564.

The output of the combiner 566 is provided, subsequent to normalization by the layer norm 568, to the feed forward 570 (e.g., a fully connected feed forward neural network). In a particular example, the feed forward 570 includes a first linear transformation layer coupled via a rectified linear unit (ReLU) layer to a second linear transformation layer. The feed forward 570 generates an output by processing the output of the combiner 566.

The combiner 572 generates an output by combining the output of the combiner 566 with the output of the feed forward 570. In a particular aspect, the layer norm 526 generates encoded data 528 by applying normalization to the output of the combiner 572 (e.g., of a last encoding layer of the one or more encoding layers 554). For example, applying normalization includes adjusting each value of the output (e.g., an output vector) of the combiner 572 to be within a particular range.

Returning to FIG. 4A, the input representation encoder 450 is configured to encode the input representation 123 independently of the one or more control parameters 125 to generate the first encoded data 458. Each of the person encoder 420, the emotion encoder 430, and the rate encoder 440 is configured to encode the input representation 123 based on the one or more control parameters 125 to generate encoded data. For example, encoding the input representation 123 based on the one or more control parameters 125 includes encoding the merged style data 127. To illustrate, the person encoder 420 generates the person encoded data 428 by encoding the merged style data 127. The emotion encoder 430 generates the emotion encoded data 438 by encoding the merged style data 127. The rate encoder 440 generates the rate of speech encoded data 448 by encoding the merged style data 127.

In a particular aspect, the person encoder 420, the emotion encoder 430, and the rate encoder 440 differ from each other in the weights or matrices used by the corresponding multi-head attention 564. For example, the multi-head attention 564 of the person encoder 420 uses a first set of matrices indicating a first set of weights to generate Query vectors, Key vectors, and Value vectors. The multi-head attention 564 of the emotion encoder 430 uses a second set of matrices indicating a second set of weights to generate Query vectors, Key vectors, and Value vectors. Similarly, the multi-head attention 564 of the rate encoder 440 uses a third set of matrices indicating a third set of weights to generate Query vectors, Key vectors, and Value vectors.

The multi-encoder 192 provides the encoded data 193 to the decoder 194. For example, the encoded data 193 includes the first encoded data 458 that is independent of the one or more control parameters 125. In a particular aspect, the encoded data 193 also includes second encoded data (e.g., the person encoded data 428, the emotion encoded data 438, the rate of speech encoded data 448, or a combination thereof) that is based on the one or more control parameters 125.

The decoder 194 includes a decoder pre-net 460, a combiner 462, one or more decoding layers 498, a layer norm 492, a linear transform layer (linear) 494, or a combination thereof. Each decoding layer of the one or more decoding layers 498 includes a masked attention layer, an attention layer, and a feed forward layer. For example, the masked attention layer includes a layer norm 464 coupled via a masked multi-head attention 466 (e.g., a masked decoder attention network) to a plurality of normalization layers (layer norms), such as a layer norm 468, a layer norm 470, a layer norm 472, a layer norm 474, or a combination thereof. The attention layer includes a plurality of decoder attention networks coupled via a combiner 486 to a layer norm 488. For example, the plurality of decoder attention networks (e.g., decoder multi-head attention networks) include a multi-head attention 478, a multi-head attention 480, a multi-head attention 482, a multi-head attention 484, or a combination thereof. The feed forward layer includes a feed forward 490 (e.g., a fully connected feed forward neural network).

The masked attention layer is coupled to the attention layer. For example, each of the plurality of layer norms of the masked attention layer is coupled to a corresponding multi-head attention network of the attention layer. For example, the layer norm 468, the layer norm 470, the layer norm 472, and the layer norm 474 are coupled to the multi-head attention 478, the multi-head attention 480, the multi-head attention 482, and the multi-head attention 484, respectively. The masked multi-head attention 466 is coupled via the combiner 486 to the layer norm 488. The attention layer is coupled to the feed forward layer. For example, the layer norm 488 is coupled to the feed forward 490.

The combiner 462 is coupled to a decoding layer of the one or more decoding layers 498. For example, the combiner 462 is coupled to the layer norm 464 of the decoding layer. A decoding layer of the one or more decoding layers 498 is coupled to the layer norm 492. For example, the feed forward 490 of the decoding layer is coupled to the layer norm 492.

In a particular aspect, the decoder pre-net 460 receives feedback output spectral data 429 corresponding to an output spectral data 129 generated by the decoder 194 for a previous time step. The decoder pre-net 460 includes a neural network (e.g., a CNN) that processes the feedback output spectral data 429 to generate an output. In a particular aspect, the decoder pre-net 460 adds convolution. In a particular aspect, the combiner 462 generates an output by combining the output of the decoder pre-net 460 and positional encoding data 461.

The output of the combiner 462 is processed by a decoding layer of the one or more decoding layers 498. For example, the output of the combiner 462 is provided, subsequent to normalization by the layer norm 464 of the decoding layer, to the masked multi-head attention 466. In a particular aspect, the masked multi-head attention 466 masks future positions in the input to the masked multi-head attention 466. The masked multi-head attention 466 generates Query vectors, Key vectors, and Value vectors from the masked version of the input to the masked multi-head attention 466. Each attention head of the masked multi-head attention 466 processes a Query vector, a Key vector, and a Value vector to generate an output. The independent outputs of the attention heads of the masked multi-head attention 466 are concatenated and linearly transformed to generate an output of the masked multi-head attention 466.

The output of the masked multi-head attention 466 is provided to the combiner 486 and, subsequent to normalization, to the plurality of multi-head attentions of the decoding layer. For example, the output of the masked multi-head attention 466 is provided subsequent to normalization by the layer norm 468, the layer norm 470, the layer norm 472, and the layer norm 474 to the multi-head attention 478, the multi-head attention 480, the multi-head attention 482, and the multi-head attention 484, respectively.

Each of the plurality of multi-head attentions of the decoding layer is configured to process the normalized version of the output of the masked multi-head attention 466 and the encoded data received from the corresponding encoder of the multi-encoder 192. For example, each of the plurality of multi-head attentions of the decoding layer processes (e.g., generates and processes) Query vectors that are based on the normalized version of the output of the masked multi-head attention 466 and processes (e.g., generates and processes) Key vectors and Value vectors that are based on the encoded data received from the corresponding encoder of the multi-encoder 192. To illustrate, the multi-head attention 484 is configured to process Query vectors that are based on the output of the layer norm 474 and processes Key vectors and Value vectors that are based on the first encoded data 458. The multi-head attention 478, the multi-head attention 480, and the multi-head attention 482 are configured to process the person encoded data 428, the emotion encoded data 438, and the rate of speech encoded data 448, respectively, and the output of the layer norm 468, the layer norm 470, and the layer norm 472, respectively. For example, the multi-head attention 478 processes Query vectors that are based on the output of the layer norm 468 and processes Key vectors and Value vectors that are based on the person encoded data 428.

The combiner 486 generates an output by combining the output of the masked multi-head attention 466 with an output of the multi-head attention 478, an output of the multi-head attention 480, an output of the multi-head attention 482, an output of the multi-head attention 484, or a combination hereof. The output of the combiner 486 is provided, subsequent to normalization by the layer norm 488, to the feed forward 490 of the decoding layer.

The output of the feed forward 490 of a particular decoding layer of the one or more decoding layers 498 is provided, subsequent to normalization by the layer norm 492 and linear transformation by the layer norm 492, to the speech synthesizer 130 as the output spectral data 129. In a particular aspect, the speech synthesizer 130 performs speech synthesis based on the output spectral data 129, the encoded data 193, or a combination thereof, to generate the synthesized speech signal 131. The output spectral data 129 is provided to the decoder pre-net 460 as the feedback output spectral data 429 for a subsequent time step.

The one or more decoding layers 498 including a single decoding layer is provided as an illustrative example. In other examples, the one or more decoding layers 498 include multiple decoding layers with an output of the combiner 462 coupled to the layer norm 464 of an initial decoding layer, the feed forward 490 of each previous decoding layer coupled to the layer norm 464 of a subsequent encoding layer, and the feed forward 490 of a last decoding layer coupled to the layer norm 492. The last encoding layer of the multi-encoder 192 provides the encoded data 193 to the plurality of multi-head attentions of each of the one or more decoding layers 498.

In a particular aspect, the adjuster 314 of FIG. 3 adjusts configuration parameters (e.g., neural network weights) of the multi-encoder 192 and the decoder 194 based on the loss metric 313. For example, the adjuster 314, in response to determining that a person loss metric of the loss metric 313 fails to satisfy a person loss threshold, trains the neural network weights of the one or more encoding layers 424 of the person encoder 420, the multi-head attention 478, the masked multi-head attention 466, the feed forward 490 of the one or more decoding layers 498, the decoder pre-net 460, or a combination thereof.

Figure 4B:
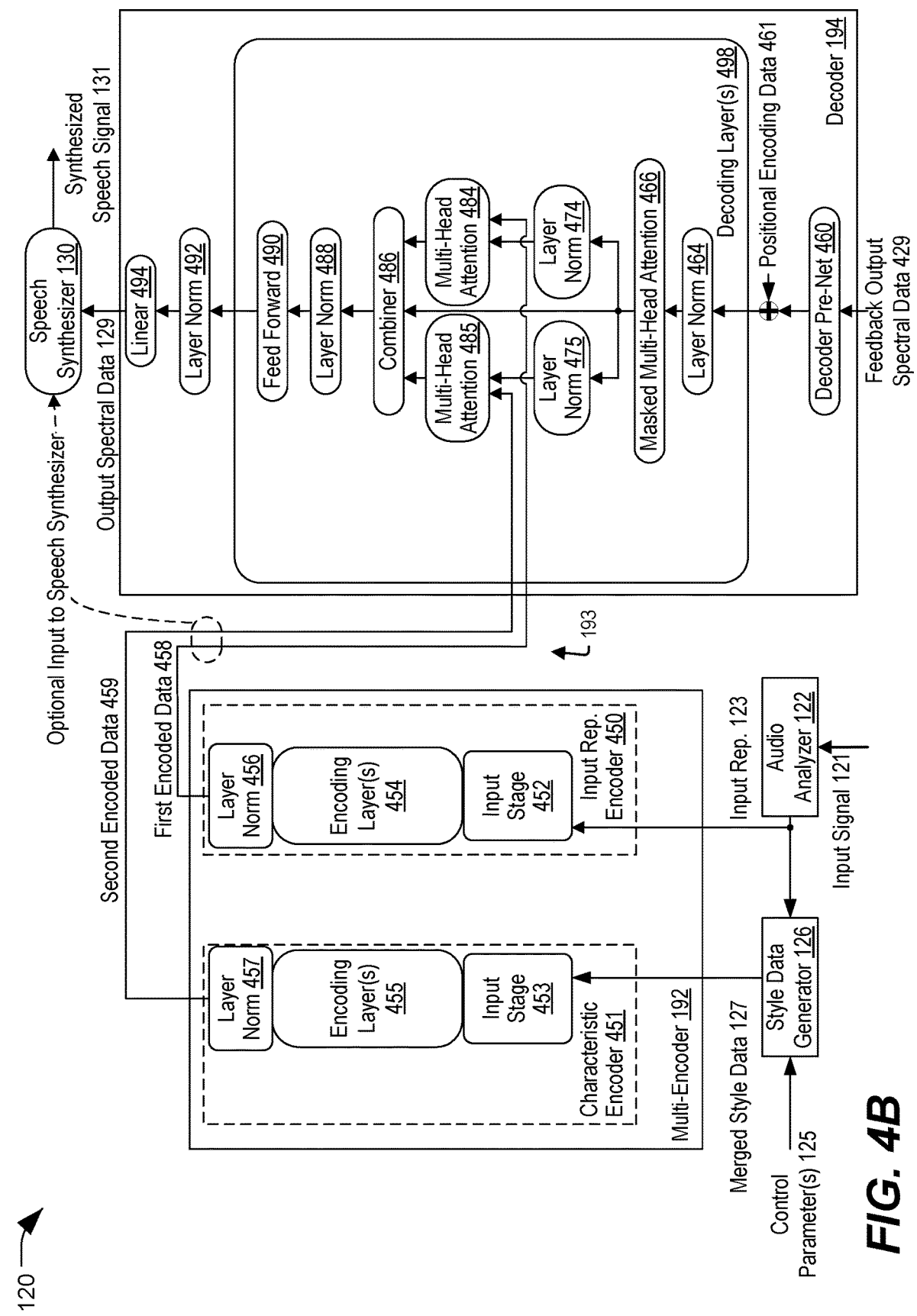
FIG. 4B is a diagram of another particular implementation of the speech generator of FIG. 1, in accordance with some examples of the present disclosure.

Referring to FIG. 4B, a particular implementation of the speech generator 120 is shown. The multi-encoder 192 includes a characteristic encoder 451 for the speech characteristics instead of a separate speech characteristic encoder for each speech characteristic. For example, the characteristic encoder 451 includes an input stage 453, one or more encoding layers 455, and a layer norm 457. In a particular aspect, the encoder 500 of FIG. 5 is an example of an implementation of the characteristic encoder 451. For example, the input stage 522 corresponds to the input stage 453, the one or more encoding layers 554 correspond to the one or more encoding layers 455, and the layer norm 526 corresponds to the layer norm 457.

The characteristic encoder 451 receives the merged style data 127 (e.g., an input embedding vector) from the style data generator 126. In a particular aspect, the input stage 453 generates an output by combining the merged style data 127 with positional encoding data. The output of the input stage 453 is processed by the one or more encoding layers 455, as described with reference to the one or more encoding layers 554 of FIG. 5. The output of the one or more encoding layers 455 is provided, subsequent to normalization by the layer norm 457, as second encoded data 459 to the decoder 194. For example, the encoded data 193 includes the first encoded data 458 and the second encoded data 459.

The one or more decoding layers 498 include the masked multi-head attention 466 coupled, via normalization layers (layer norms), to two multi-head attentions. For example, the masked multi-head attention 466 is coupled via a layer norm 475 to a multi-head attention 485 and via the layer norm 474 to the multi-head attention 484. The combiner 486 is coupled to the masked multi-head attention 466, the multi-head attention 485, and the multi-head attention 484.

An output of the masked multi-head attention 466 is provided, subsequent to normalization by the layer norm 475, to the multi-head attention 485. The characteristic encoder 451 provides the second encoded data 459 to the multi-head attention 485. The multi-head attention 485 generates Query vectors based on the output of the masked multi-head attention 466 and generates Key vectors and Value vectors based on the second encoded data 459. Each attention head of the multi-head attention 485 processes a Query vector, a Key vector, and a Value vector to generate an output. Outputs of each of the attention heads of the multi-head attention 485 are concatenated and linearly transformed to generate an output of the multi-head attention 485. The combiner 486 generates an output by combining the output of the masked multi-head attention 466 with an output of the multi-head attention 485, an output of the multi-head attention 484, or both.

In a particular aspect, the adjuster 314 of FIG. 3 adjusts configuration parameters (e.g., neural network weights) of the multi-encoder 192 and the decoder 194 based on the loss metric 313. For example, the adjuster 314, in response to determining that any of a person loss metric, an emotion loss metric, or a rate of speech loss metric of the loss metric 313 fails to satisfy a corresponding loss threshold, trains the neural network weights of the one or more encoding layers 455 of the characteristic encoder 451, the multi-head attention 485, the masked multi-head attention 466, the feed forward 490 of the one or more decoding layers 498, the decoder pre-net 460, or a combination thereof.

Figure 6:
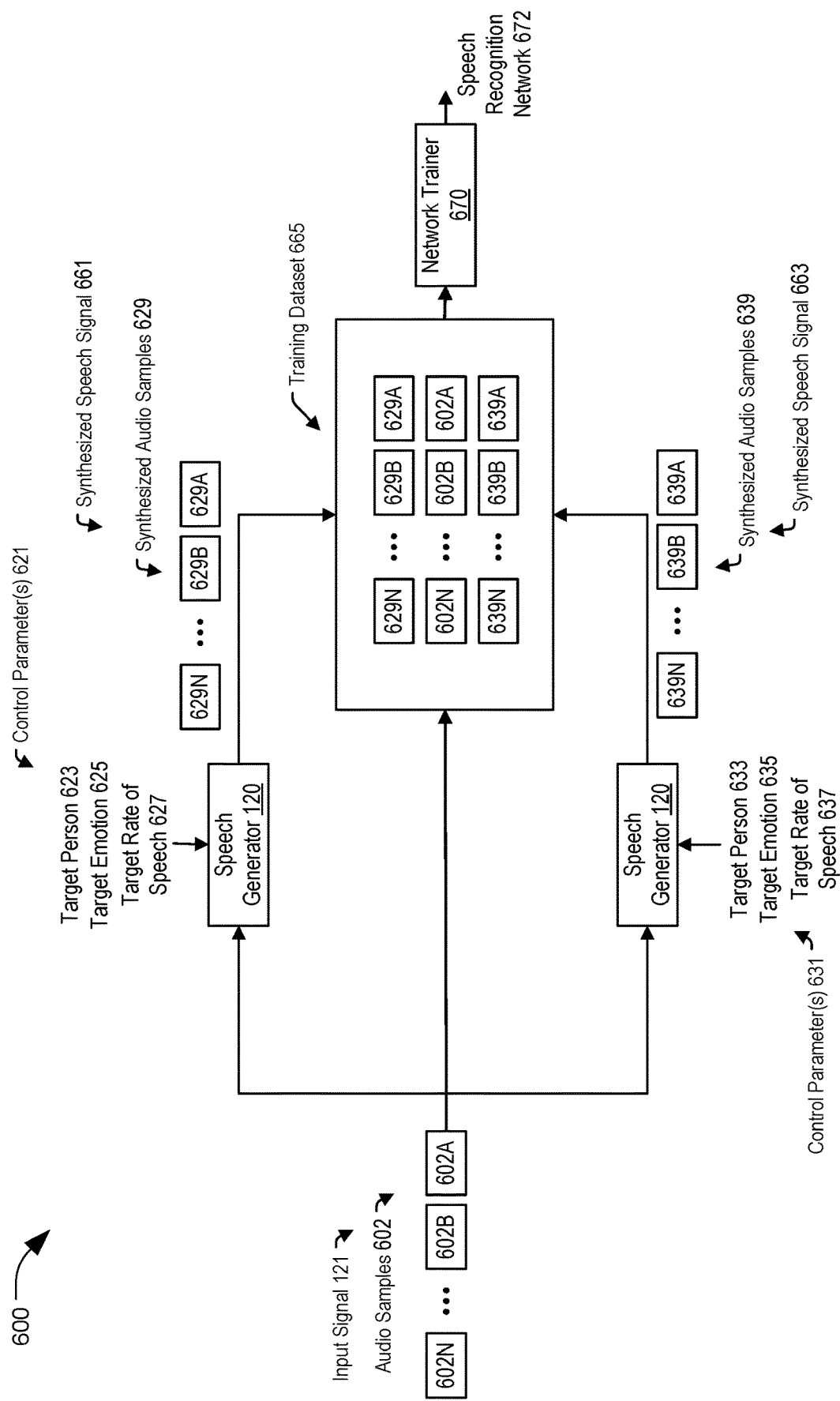
FIG. 6 is a diagram of an illustrative aspect of operations of components of the system of FIG. 1, in accordance with some examples of the present disclosure.

Referring to FIG. 6, an illustrative aspect of operations of components of the system 100 of FIG. 1 is shown and generally designated 600. The input signal 121 includes a plurality of audio samples 602, e.g., audio samples 602A, audio samples 602B, one or more additional sets of audio samples, such as Nth audio samples 602N (where N is an integer greater than two), or a combination thereof. The audio samples 602 represent speech of a particular person (e.g., the person 180), a particular emotion (e.g., neutral or bored), a particular rate of speech (e.g., medium speed), or a combination thereof.

The speech generator 120 receives (e.g., accesses) one or more control parameters 621. The one or more control parameters 621 indicate a target person 623 (e.g., the person 180), a target emotion 625 (e.g., excited), a target rate of speech 627 (e.g., a fast rate of speech), or a combination thereof. The one or more control parameters 621 indicate speech characteristics of a synthesized speech signal 661 to be generated by the speech generator 120 based on the input signal 121. In a particular example, at least one of the target person 623, the target emotion 625, and the target rate of speech 627 is different from the particular person, the particular emotion, and the particular rate of speech, respectively. The speech generator 120 processes the input signal 121 based on the one or more control parameters 621, as described with reference to FIG. 1, to generate the synthesized speech signal 661. The synthesized speech signal 661 includes synthesized audio samples 629 that are based on the target person 623, the target emotion 625, the target rate of speech 627, or a combination thereof. For example, the synthesized audio samples 629 represent speech having similar speech characteristics as the target person 623 (e.g., the person 180), similar speech characteristics (e.g., pitch or tone) associated with the target emotion 625 (e.g., excited), the target rate of speech 627 (e.g., a fast rate of speech), or a combination thereof. In a particular aspect, the speech generator 120 (or another component of the device 102) adds the audio samples 602 and the synthesized audio samples 629 to a training dataset 665.

In a particular aspect, the speech generator 120 generates, from the same input signal 121, multiple sets of audio samples having various speech characteristics corresponding to various control parameters. For example, the speech generator 120 receives (e.g., accesses) one or more control parameters 631 indicating a target person 633 (e.g., the person 180), a target emotion 635 (e.g., tired), a target rate of speech 637 (e.g., a slow rate of speech), or a combination thereof. The speech generator 120 processes the input signal 121 based on the one or more control parameters 631, as described with respect to FIG. 1, to generate a synthesized speech signal 663. The synthesized speech signal 663 includes synthesized audio samples 639 that are based on the target person 633 (e.g., the person 180), the target emotion 635 (e.g., tired), the target rate of speech 637 (e.g., a slow rate of speech), or a combination thereof. In a particular aspect, the speech generator 120 (or another component of the device 102) adds the synthesized audio samples 639 to the training dataset 665.

A network trainer 670 uses machine learning techniques to train a speech recognition network 672 based on the training dataset 665. Including the synthesized audio samples 629 and the synthesized audio samples 639 in the training dataset 665 (in addition to the audio samples 602) improves accuracy of the speech recognition network 672 in recognizing speech. For example, the speech recognition network 672 (trained based on the synthesized audio samples 629 and the synthesized audio samples 639) is more robust in recognizing speech of the person 180 having different characteristics (e.g., fast or slow and tired or excited) than the characteristics (e.g., neutral) of the speech provided by the person 180 in the input signal 121.

Figure 7:
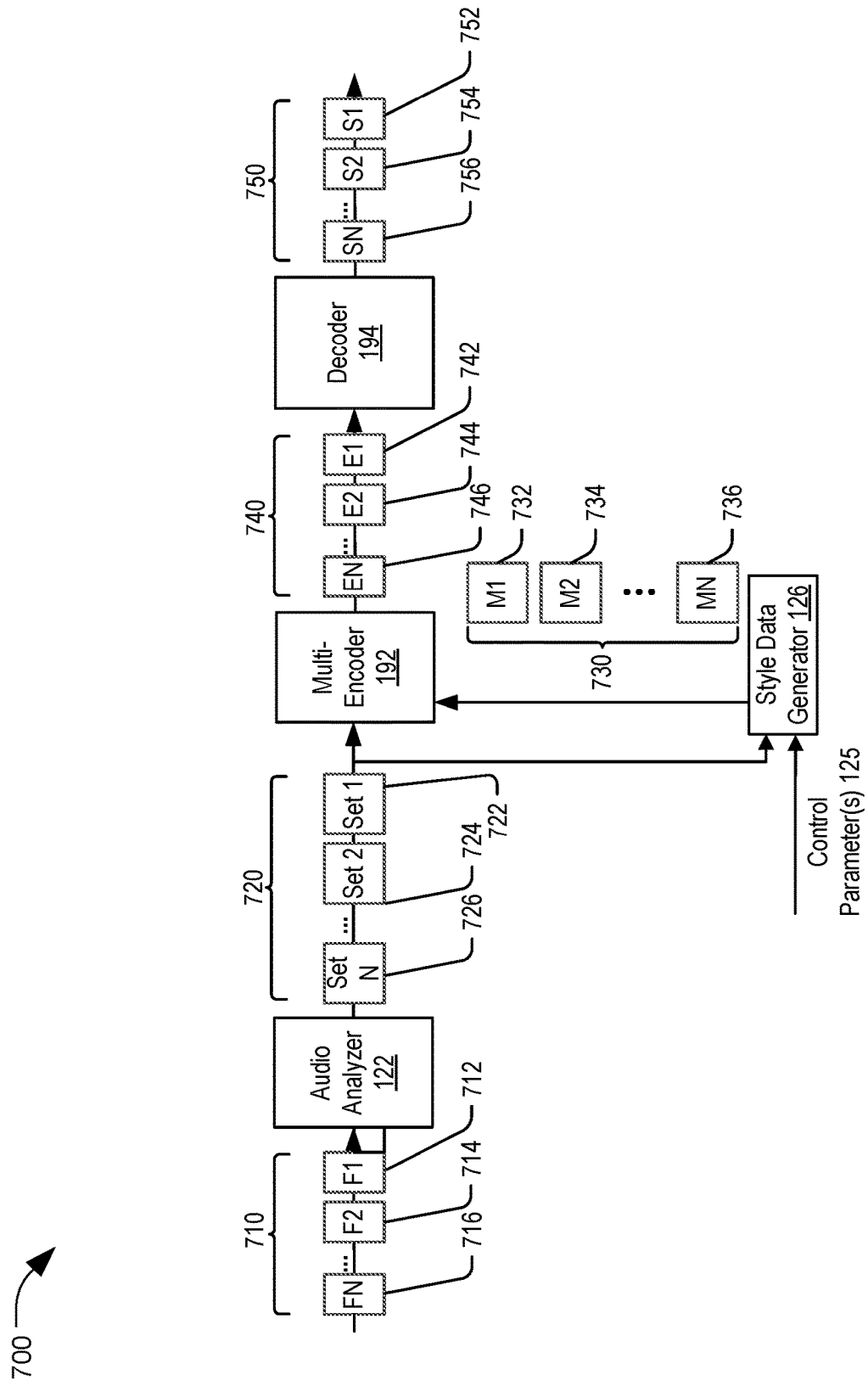
FIG. 7 is a diagram of an illustrative aspect of operations of components of the system of FIG. 1, in accordance with some examples of the present disclosure.

FIG. 7 is a diagram of an illustrative aspect of operation of components of the system of FIG. 1. The audio analyzer 122 is configured to receive a sequence 710 of audio data samples, such as a sequence of successively captured frames of the input signal 121, illustrated as a first frame (F1) 712, a second frame (F2) 714, and one or more additional frames including an Nth frame (FN) 716 (where N is an integer greater than two). The audio analyzer 122 is configured to output a sequence 720 of sets of input representation data, such as a sequence of sets of the input representation 123, including a first set 722, a second set 724, and one or more additional sets including an Nth set 726.

The style data generator 126 is configured to receive the sequence 720 of sets of the input representation data and generate a sequence 730 of sets of merged style data based on the sequence 720 and the one or more control parameters 125. The sequence 730 includes a first set (M1) 732, a second set (M2) 734, and one or more additional sets including an Nth set (MN) 736. The multi-encoder 192 is configured to receive the sequence 720 and the sequence 730 and to generate a sequence 740 of encoded sets of data, such as a first encoded set (E1) 742, a second encoded set (E2) 744, and one or more additional encoded sets including an Nth set (EN) 746. The decoder 194 is configured to receive the sequence 740 of encoded sets and generate a sequence 750 of spectral data, including first spectral data (S1) 752, second spectral data (S2) 754, and one or more additional sets of spectral data including Nth spectral data (SN) 756.

During operation, the audio analyzer 122 processes the first frame (F1) 712 to generate the first set 722 of the input representation 123 and the style data generator 126 processes the first set 722 to generate the first set (M1) 732 of the merged style data 127. The multi-encoder 192 processes the first set 722 of the input representation 123 and the first set (M1) 732 of the merged style data 127 to generate the first encoded set (E1) of the encoded data 193. The decoder 194 processes the first encoded set (E1) of the encoded data 193 to generate the first spectral data (S1) 752 of the output spectral data 129. A subsequent encoded set (e.g., the second encoded set (E2)) is processed by the decoder 194 at least partially based on the first spectral data (S1) 752. Such processing continues, including the audio analyzer 122 processing the Nth frame 716 to generate the Nth set 726 of the input representation 123, the style data generator 126 processing the Nth set 726 of the input representation 123 to generate the Nth set (MN) 736 of the merged style data 127, the multi-encoder 192 processing the Nth set 726 of the input representation 123 and the Nth set (MN) 736 of the merged style data 127 to generate the Nth encoded set (EN) 746 of the encoded data 193, and the decoder 194 processing the Nth encoded set (EN) 746 of the encoded data 193 to generate the Nth spectral data (SN) 756. The Nth spectral data (SN) 756 is based on the Nth set 726 of feature data and at least partially based on one or more of the previous sets of feature data of the sequence 720. By decoding based on one or more prior sets of spectral data, accuracy of synthesized speech generation by the decoder 194 may be improved for speech signals that may span multiple frames of audio data.

Figure 8:
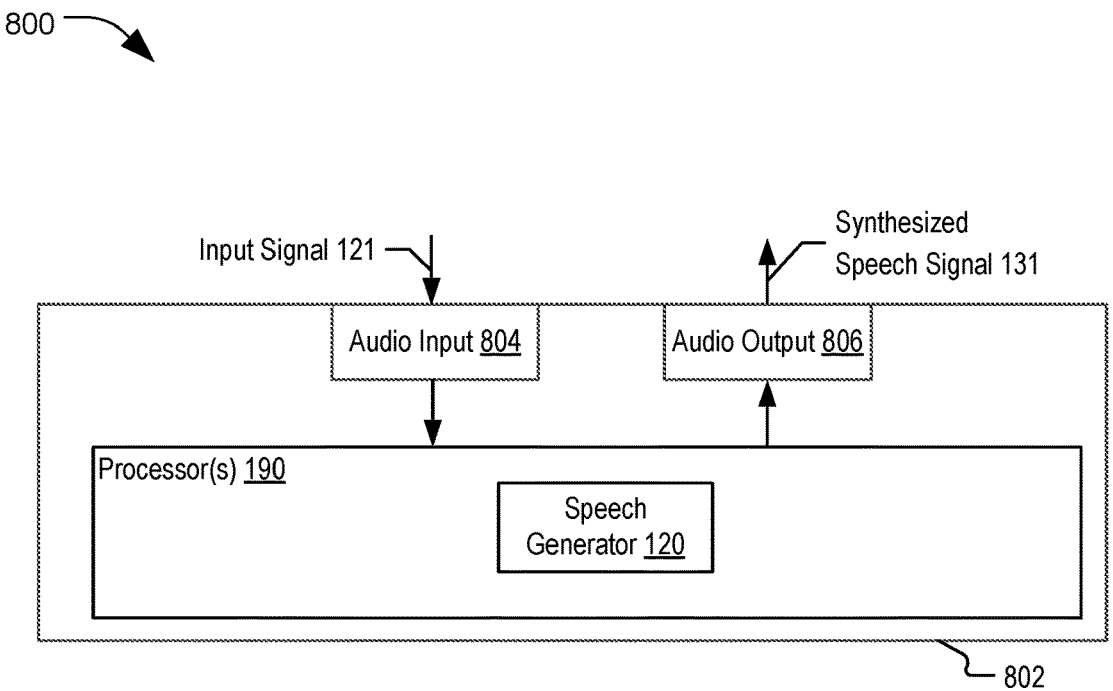
FIG. 8 illustrates an example of an integrated circuit operable to generate synthesized speech, in accordance with some examples of the present disclosure.
Figure 12:
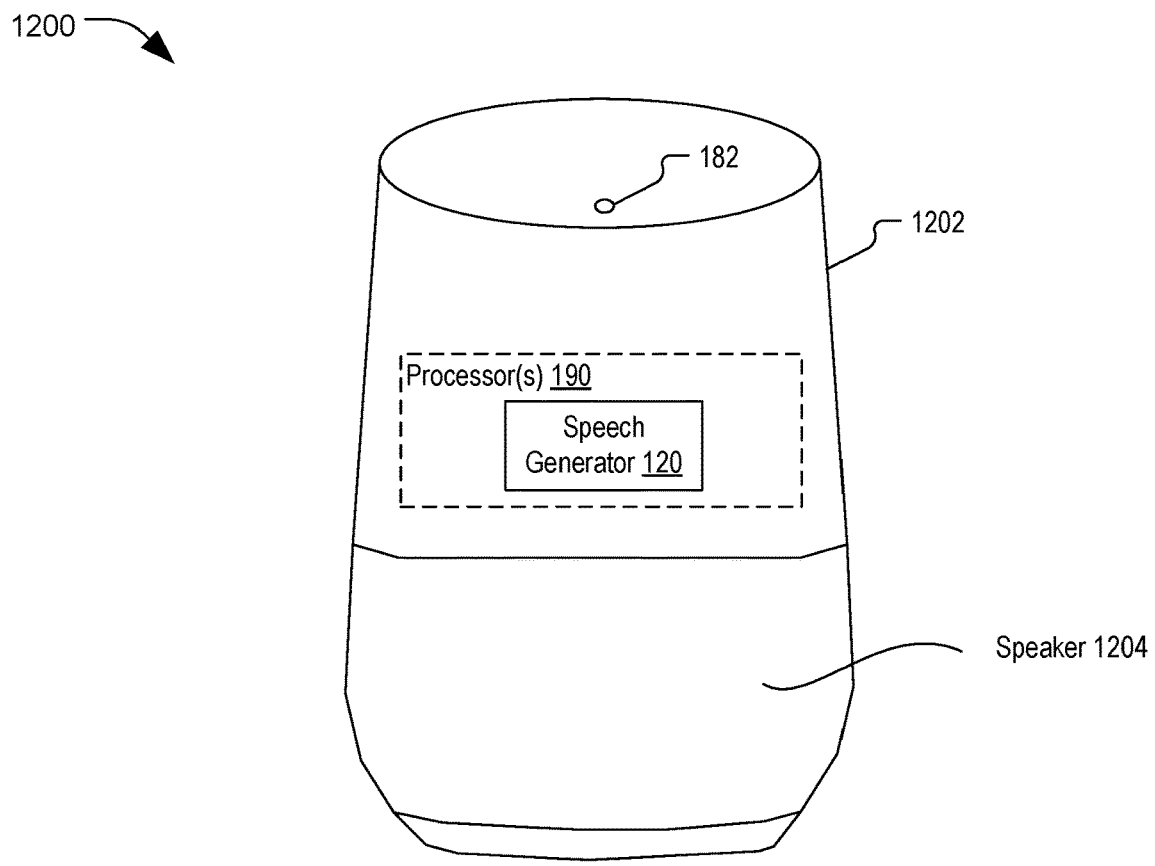
FIG. 12 is a diagram of a voice-controlled speaker system operable to generate synthesized speech, in accordance with some examples of the present disclosure.
Figure 13:
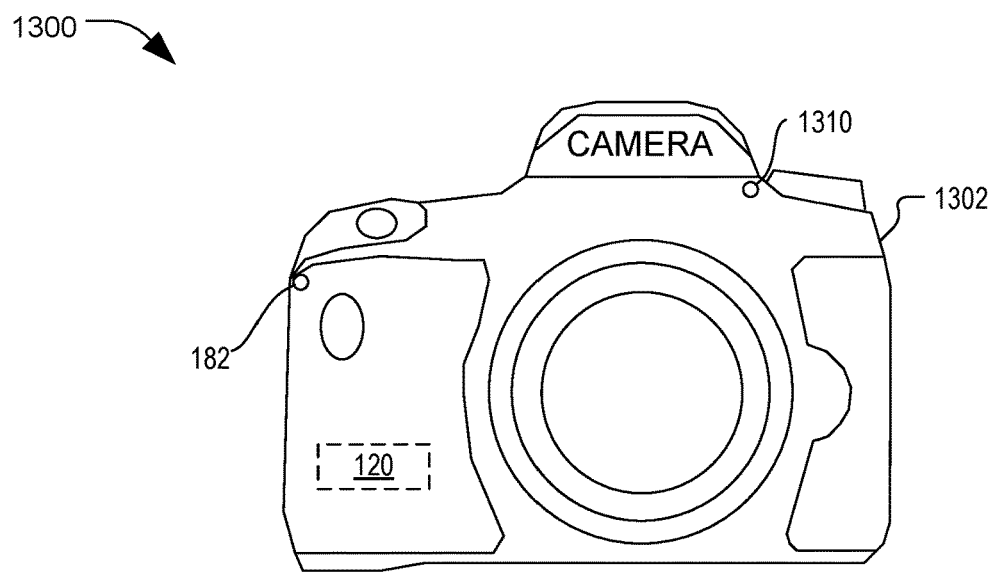
FIG. 13 is a diagram of a camera operable to generate synthesized speech, in accordance with some examples of the present disclosure.
Figure 14:
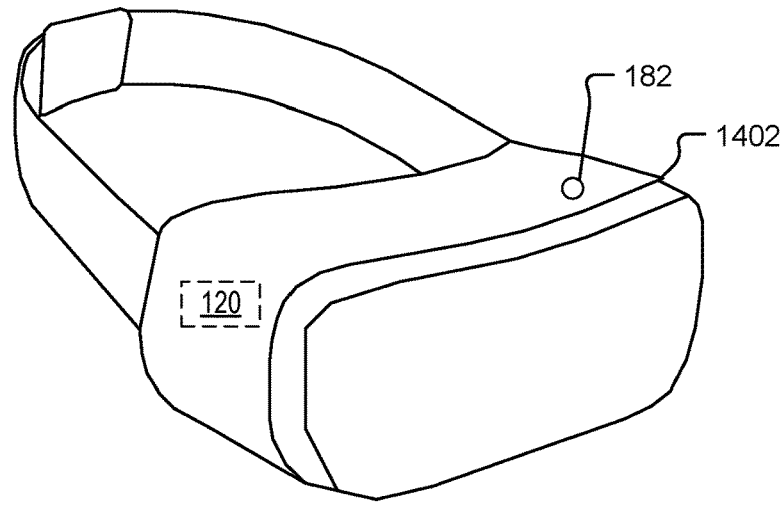
FIG. 14 is a diagram of a headset, such as a virtual reality or augmented reality headset, operable to generate synthesized speech, in accordance with some examples of the present disclosure.
Figure 15:
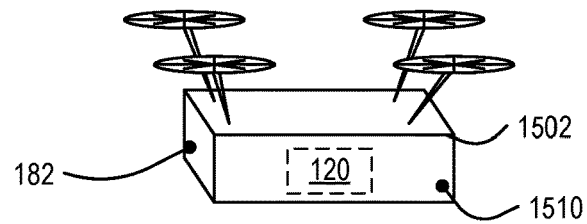
FIG. 15 is a diagram of a first example of a vehicle operable to generate synthesized speech, in accordance with some examples of the present disclosure.
Figure 16:
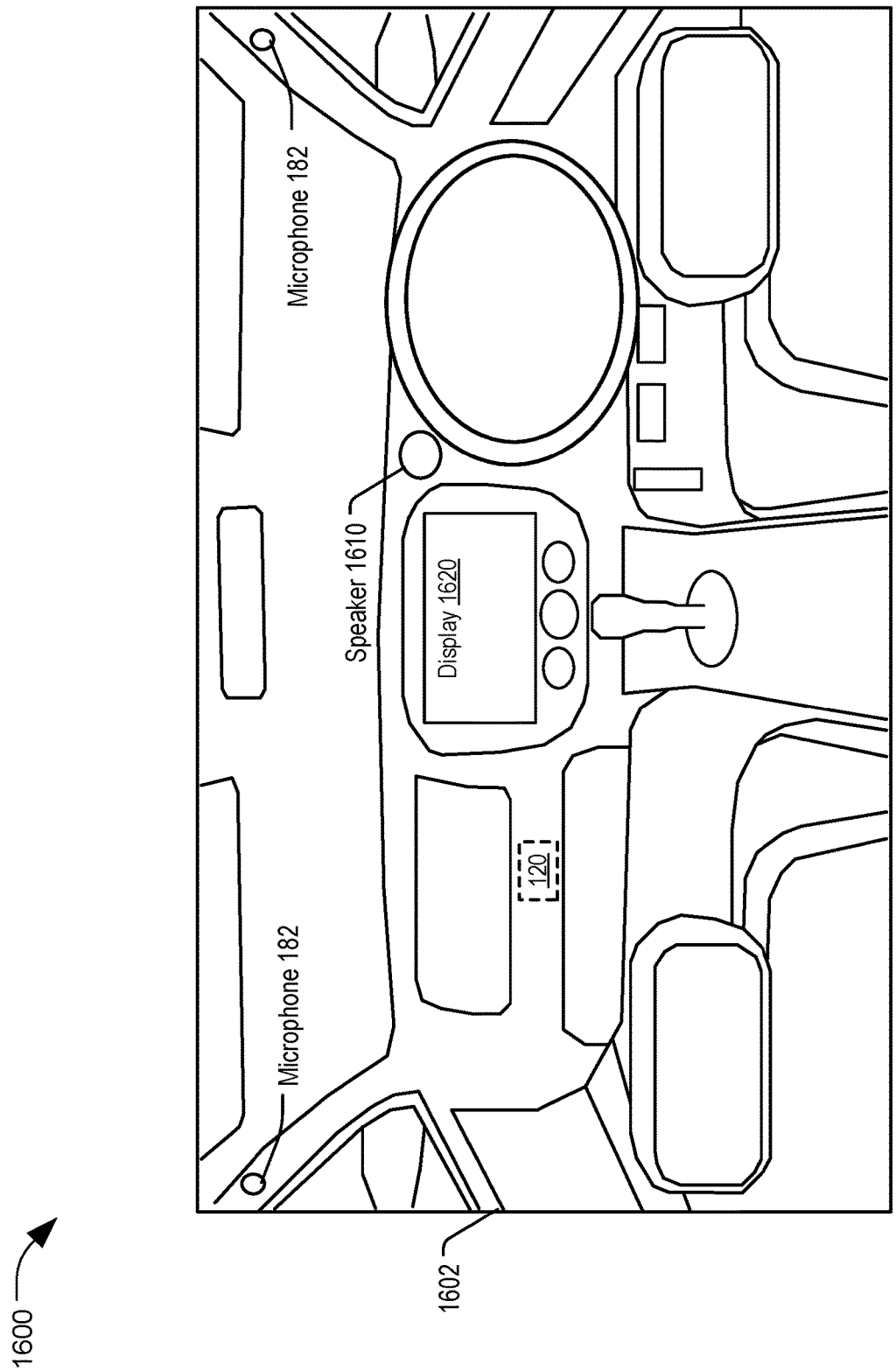
FIG. 16 is a diagram of a second example of a vehicle operable to generate synthesized speech, in accordance with some examples of the present disclosure.

FIG. 8 depicts an implementation 800 of the device 102 as an integrated circuit 802 that includes the one or more processors 190. The integrated circuit 802 also includes an audio input 804, such as one or more bus interfaces, to enable the input signal 121 to be received for processing. The integrated circuit 802 also includes an audio output 806, such as a bus interface, to enable sending of an output signal, such as the synthesized speech signal 131. The integrated circuit 802 enables implementation of synthesized speech generation as a component in a system that includes microphones, such as a mobile phone or tablet as depicted in FIG. 9, a headset as depicted in FIG. 10, a wearable electronic device as depicted in FIG. 11, a voice-controlled speaker system as depicted in FIG. 12, a camera as depicted in FIG. 13, a virtual reality headset or an augmented reality headset as depicted in FIG. 14, or a vehicle as depicted in FIG. 15 or FIG. 16.

Figure 9:
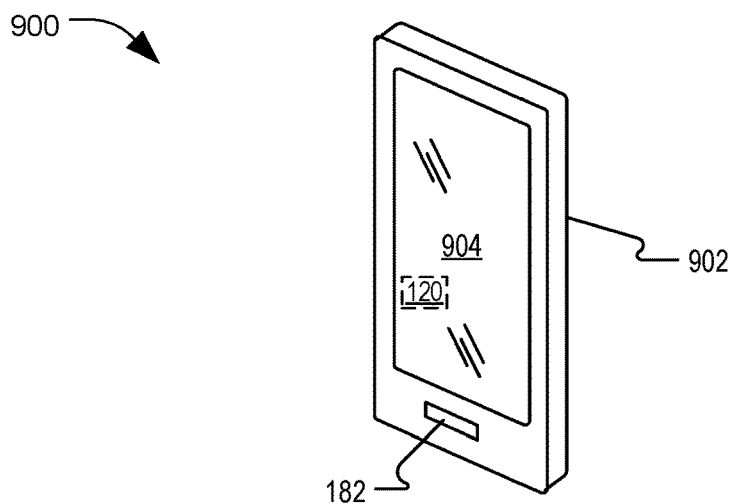
FIG. 9 is a diagram of a mobile device operable to generate synthesized speech, in accordance with some examples of the present disclosure.

FIG. 9 depicts an implementation 900 in which the device 102 includes a mobile device 902, such as a phone or tablet, as illustrative, non-limiting examples. The mobile device 902 includes the microphone 182, and a display screen 904. Components of the processor 190, including the speech generator 120, are integrated in the mobile device 902 and are illustrated using dashed lines to indicate internal components that are not generally visible to a user of the mobile device 902. In a particular example, the speech generator 120 operates to generate synthesized speech (or the speech recognition network 672 of FIG. 6 operates to recognize speech), which is then processed to perform one or more operations at the mobile device 902, such as to launch a graphical user interface or otherwise display other information associated with the user's speech at the display screen 904 (e.g., via an integrated "smart assistant" application).

Figure 10:
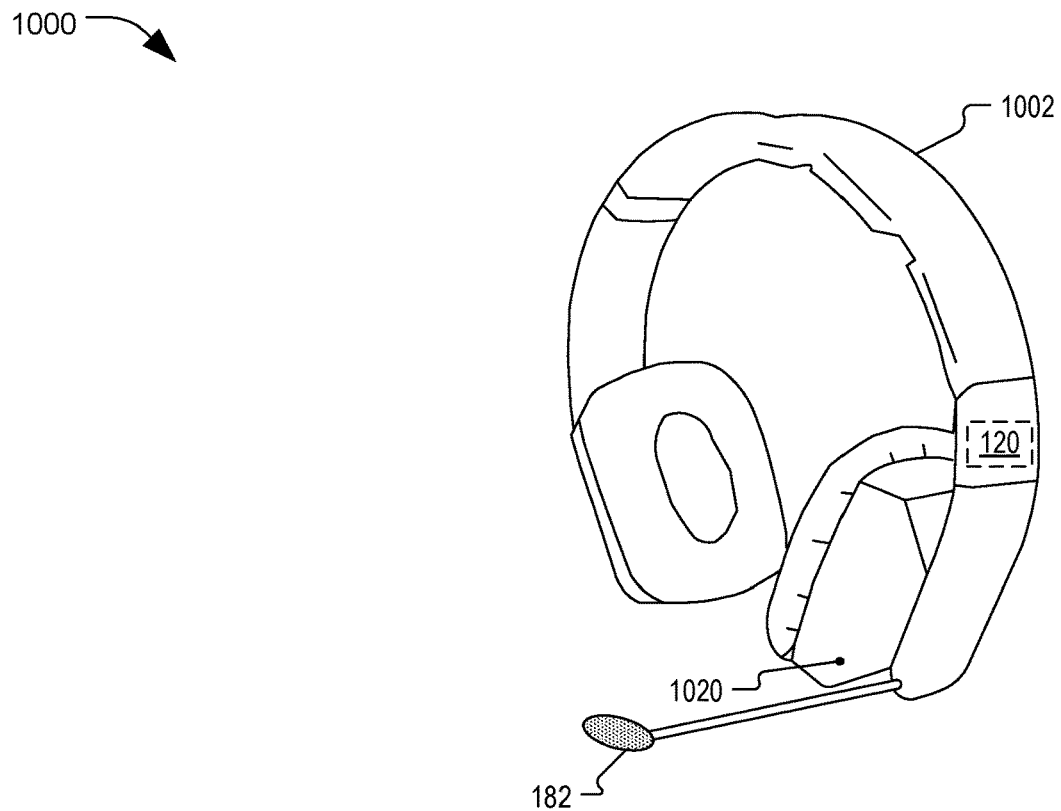
FIG. 10 is a diagram of a headset operable to generate synthesized speech, in accordance with some examples of the present disclosure.

FIG. 10 depicts an implementation 1000 in which the device 102 includes a headset device 1002. The headset device 1002 includes the microphone 182. Components of the processor 190, including the speech generator 120, are integrated in the headset device 1002. In a particular example, the speech generator 120 operates to generate synthesized speech (or the speech recognition network 672 of FIG. 6 operates to recognize speech), which may cause the headset device 1002 to perform one or more operations at the headset device 1002, to transmit audio data corresponding to the synthesized speech to a second device (not shown), for further processing, or a combination thereof.

Figure 11:
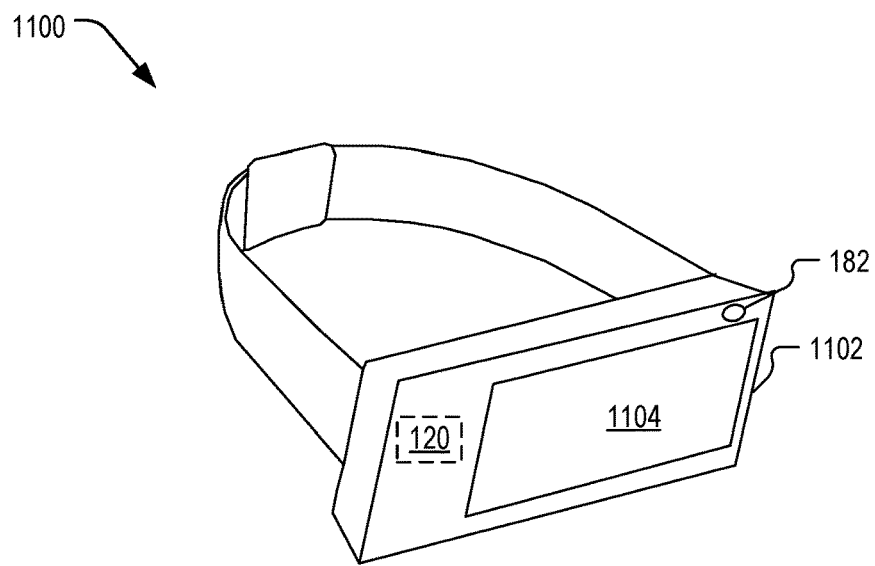
FIG. 11 is a diagram of a wearable electronic device operable to generate synthesized speech, in accordance with some examples of the present disclosure.

FIG. 11 depicts an implementation 1100 in which the device 102 includes a wearable electronic device 1102, illustrated as a "smart watch." The speech generator 120 and the microphone 182 are integrated into the wearable electronic device 1102. In a particular example, the speech generator 120 operates to generate synthesized speech (or the speech recognition network 672 of FIG. 6 operates to recognize speech), which is then processed to perform one or more operations at the wearable electronic device 1102, such as to launch a graphical user interface or otherwise display other information associated with the user's speech at a display screen 1104 of the wearable electronic device 1102. To illustrate, the wearable electronic device 1102 may include a display screen that is configured to display a notification based on user speech detected by the wearable electronic device 1102. In a particular example, the wearable electronic device 1102 includes a haptic device that provides a haptic notification (e.g., vibrates) in response to detection of user voice activity or generation of synthesized speech. For example, the haptic notification can cause a user to look at the wearable electronic device 1102 to see a displayed notification indicating detection of a keyword spoken by the user. The wearable electronic device 1102 can thus alert a user with a hearing impairment or a user wearing a headset that the user's voice activity is detected.

FIG. 12 is an implementation 1200 in which the device 102 includes a wireless speaker and voice activated device 1202. The wireless speaker and voice activated device 1202 can have wireless network connectivity and is configured to execute an assistant operation. The processor 190 including the speech generator 120, the microphone 182, or a combination thereof, are included in the wireless speaker and voice activated device 1202. The wireless speaker and voice activated device 1202 also includes a speaker 1204. During operation, in response to receiving a verbal command and generating synthesized speech via operation of the speech generator 120 (or recognizing speech via operation of the speech recognition network 672 of FIG. 6), the wireless speaker and voice activated device 1202 can execute assistant operations, such as via execution of an integrated assistant application. The assistant operations can include adjusting a temperature, playing music, turning on lights, etc. For example, the assistant operations are performed responsive to receiving a command after a keyword or key phrase (e.g., "hello assistant").

FIG. 13 depicts an implementation 1300 in which the device 102 includes a portable electronic device that corresponds to a camera device 1302. The speech generator 120, the microphone 182, or a combination thereof, are included in the camera device 1302. During operation, in response to receiving a verbal command and generating synthesized speech via operation of the speech generator 120 (or recognizing speech via operation of the speech recognition network 672 of FIG. 6), the camera device 1302 can execute operations responsive to spoken user commands, such as to adjust image or video capture settings, image or video playback settings, or image or video capture instructions, as illustrative examples.

FIG. 14 depicts an implementation 1400 in which the device 102 includes a portable electronic device that corresponds to a virtual reality, augmented reality, or mixed reality headset 1402. The speech generator 120, the microphone 182, or a combination thereof, are integrated into the headset 1402. In a particular aspect, the headset 1402 includes the microphone 182 positioned to primarily capture speech of a user. Synthesized speech generation can be performed based on audio signals received from the microphone 182 of the headset 1402. A visual interface device is positioned in front of the user's eyes to enable display of augmented reality or virtual reality images or scenes to the user while the headset 1402 is worn. In a particular example, the visual interface device is configured to display a notification indicating user speech detected in the audio signal.

FIG. 15 depicts an implementation 1500 in which the device 102 corresponds to, or is integrated within, a vehicle 1502, illustrated as a manned or unmanned aerial device (e.g., a package delivery drone). The speech generator 120, the microphone 182, or a combination thereof, are integrated into the vehicle 1502. Synthesized speech generation can be performed based on audio signals received from the microphone 182 of the vehicle 1502, such as for delivery instructions from an authorized user of the vehicle 1502.

FIG. 16 depicts another implementation 1600 in which the device 102 corresponds to, or is integrated within, a vehicle 1602, illustrated as a car. The vehicle 1602 includes the processor 190 including the speech generator 120. The vehicle 1602 also includes the microphone 182. The microphone 182 is positioned to capture utterances of an operator of the vehicle 1602. Synthesized speech generation can be performed based on audio signals received from the microphone 182 of the vehicle 1602. In some implementations, synthesized speech generation can be performed based on an audio signal received from interior microphones (e.g., the microphone 182), such as for a voice command from an authorized passenger. For example, the synthesized speech generation can be used to detect a voice command from an operator of the vehicle 1602 (e.g., to set a volume to 5 or to set a destination for a self-driving vehicle). In some implementations, synthesized speech generation can be performed based on an audio signal received from external microphones (e.g., the microphone 182), such as an authorized user of the vehicle. In a particular implementation, in response to receiving a verbal command and generating synthesized speech via operation of the speech generator 120, the voice activation system 162 initiates one or more operations of the vehicle 1602 based on one or more keywords (e.g., "unlock," "start engine," "play music," "display weather forecast," or another voice command) detected in the synthesized speech signal 131, such as by providing feedback or information via a display 1620 or one or more speakers (e.g., a speaker 1610).

Figure 17:
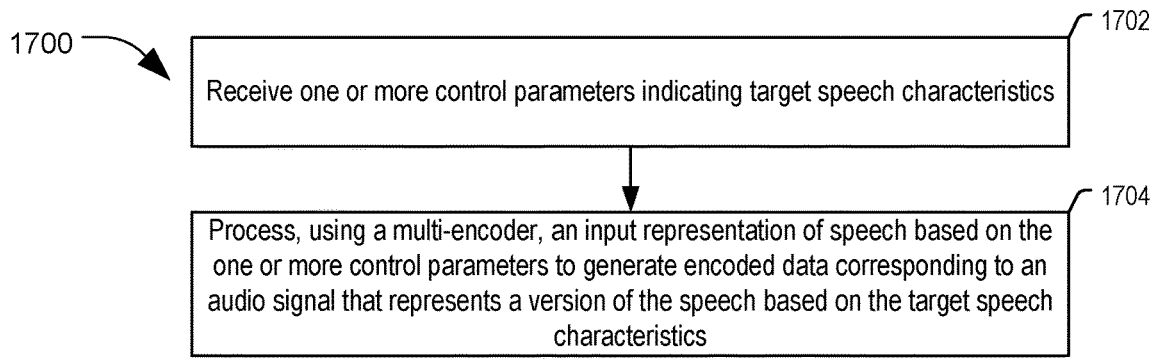
FIG. 17 is diagram of a particular implementation of a method of synthesized speech generation that may be performed by the device of FIG. 1, in accordance with some examples of the present disclosure.

Referring to FIG. 17, a particular implementation of a method 1700 of synthesized speech generation is shown. In a particular aspect, one or more operations of the method 1700 are performed by at least one of the style data generator 126, the multi-encoder 192, the decoder 194, the multi-encoder transformer 128, the speech generator 120, the one or more processors 190, the device 102, the system 100 of FIG. 1, the person encoder 206, the emotion encoder 208, the rate of speech encoder 210, the encoder pre-net 212, the person encoder 420, the emotion encoder 430, the rate encoder 440, the input representation encoder 450 of FIG.

Figure 5:
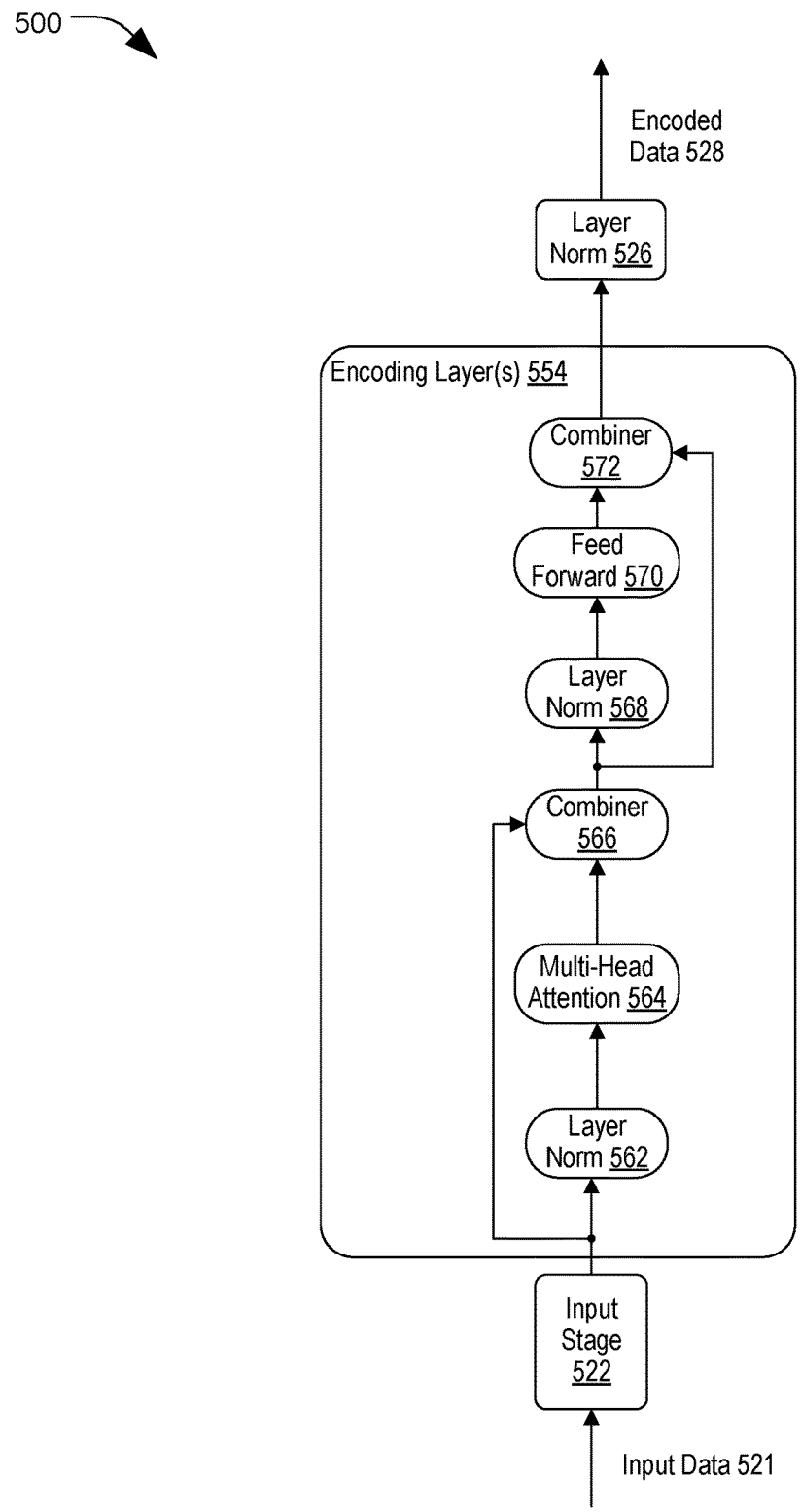
FIG. 5 is a diagram of an illustrative aspect of an encoder of the speech generator of FIG. 1, in accordance with some examples of the present disclosure.

4A, the characteristic encoder 451 of FIG. 4B, the encoder 500 of FIG. 5, or a combination thereof.

The method 1700 includes receiving one or more control parameters indicating target speech characteristics, at 1702. For example, the style data generator 126 of FIG. 1 receives the one or more control parameters 125 indicating the target speech characteristics 141, as described with reference to FIG. 1.

The method 1700 also includes processing, using a multi-encoder, an input representation of speech based on the one or more control parameters to generate encoded data corresponding to an audio signal that represents a version of the speech based on the target speech characteristics, at 1704. For example, the multi-encoder 192 processes the input representation 123 based on the one or more control parameters 125 to generate the encoded data 193 corresponding to the synthesized speech signal 131 that represents a version of the speech based on the target speech characteristics 141, as described with reference to FIG. 1.

The method 1700 enables generation of multiple synthesized speech signals corresponding to various emotions, various rates of speech, and speech characteristics of various persons based on the same input signal 121. A large and diverse synthesized speech dataset can be generated using relatively few spoken words.

The method 1700 of FIG. 17 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1700 of FIG. 17 may be performed by a processor that executes instructions, such as described with reference to FIG. 19.

Figure 18:
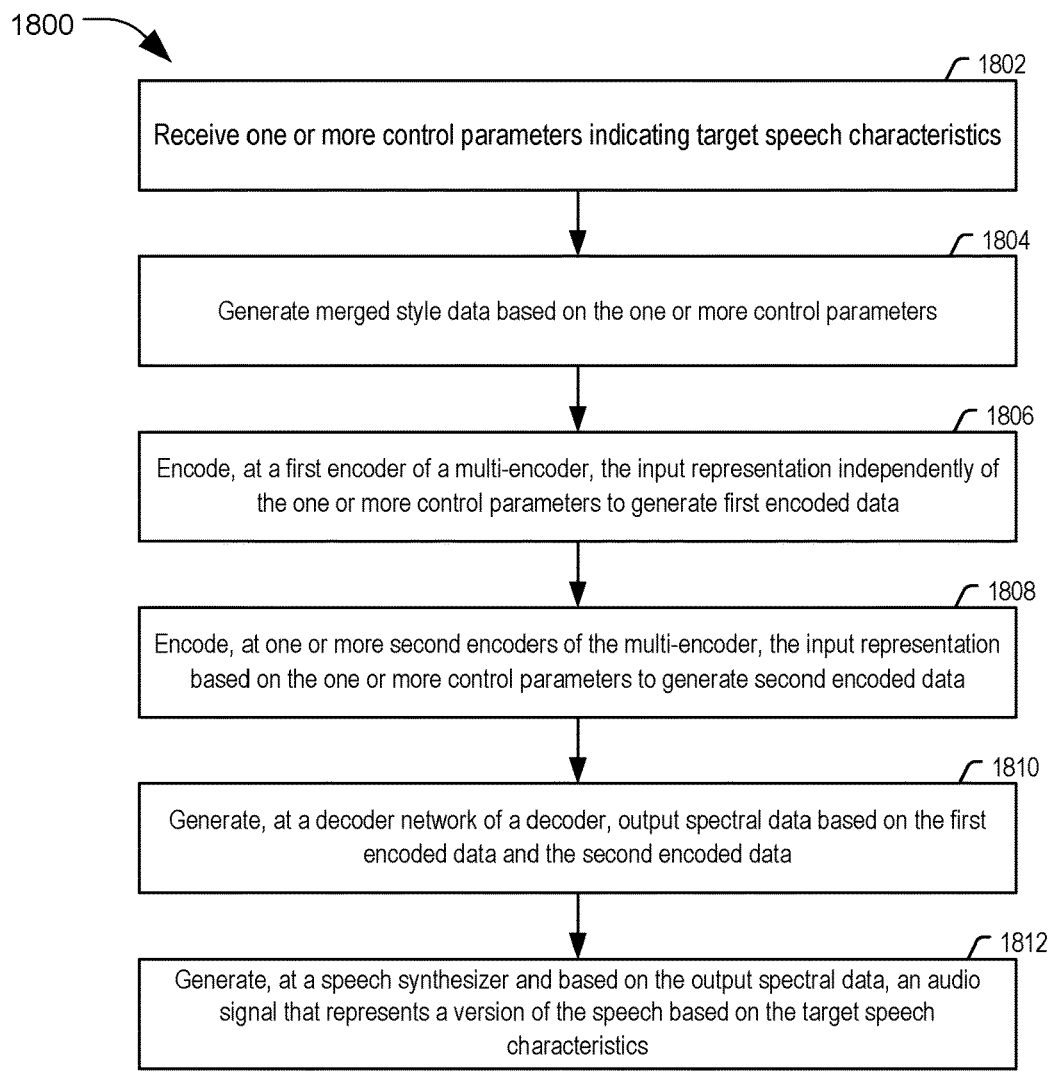
FIG. 18 is diagram of another particular implementation of a method of synthesized speech generation that may be performed by the device of FIG. 1, in accordance with some examples of the present disclosure.

Referring to FIG. 18, a particular implementation of a method 1800 of synthesized speech generation is shown. In a particular aspect, one or more operations of the method 1800 are performed by at least one of the style data generator 126, the multi-encoder 192, the decoder 194, the multi-encoder transformer 128, the speech generator 120, the speech synthesizer 130, the one or more processors 190, the device 102, the system 100 of FIG. 1, the person encoder 206, the emotion encoder 208, the rate of speech encoder 210, the encoder pre-net 212, the person encoder 420, the emotion encoder 430, the rate encoder 440, the input representation encoder 450 of FIG. 4A, the characteristic encoder 451 of FIG. 4B, the encoder 500 of FIG. 5, or a combination thereof.

The method 1800 includes receiving one or more control parameters indicating target speech characteristics, at 1802. For example, the style data generator 126 of FIG. 1 receives the one or more control parameters 125 indicating the target speech characteristics 141, as described with reference to FIG. 1.

The method 1800 also includes generating merged style data based on the one or more control parameters, at 1804. For example, the style data generator 126 of FIG. 1 generates the merged style data 127 based on the one or more control parameters 125, as described with reference to FIG. 1.

The method 1800 further includes encoding, at a first encoder of a multi-encoder, the input representation independently of the one or more control parameters to generate first encoded data, at 1806. For example, the input representation encoder 450 of the multi-encoder 192 encodes the input representation 123 independently of the one or more control parameters 125 to generate the first encoded data 458, as described with reference to FIG. 4A.

The method 1800 also includes encoding, at one or more second encoders of the multi-encoder, the input representation based on the one or more control parameters to generate second encoded data, at 1808. For example, the person encoder 420, the emotion encoder 430, and the rate encoder 440 of FIG. 4A encode the input representation 123 based on the one or more control parameters 125 to generate second encoded data (e.g., the person encoded data 428, the emotion encoded data 438, and the rate of speech encoded data 448), as described with reference to FIG. 4A. As another example, the characteristic encoder 451 of FIG. 4B encodes the input representation 123 based on the one or more control parameters 125 to generate the second encoded data 459, as described with reference to FIG. 4B.

The method 1800 further includes generating, at a decoder network of a decoder, output spectral data based on the first encoded data and the second encoded data, at 1810. For example, the decoder 194 (e.g., including a plurality of decoder networks, such as the multi-head attention 478, the multi-head attention 480, the multi-head attention 482, and the multi-head attention 484 of FIG. 4A and the multi-head attention 485 of FIG. 4B) generates the output spectral data 129 based on the encoded data 193, as described with reference to FIGS. 1 and 4A-B.

The method 1800 also includes generating, at a speech synthesizer and based on the output spectral data, an audio signal that represents a version of the speech based on the target speech characteristics, at 1812. For example, the speech synthesizer 130 of FIG. 1 generates, based on the output spectral data 129, the synthesized speech signal 131 that represents a version of the speech based on the target speech characteristics 141, as described with reference to FIG. 1.

The method 1800 enables generation of multiple synthesized speech signals corresponding to various emotions, various rates of speech, and speech characteristics of various persons based on the same input signal 121. A large and diverse synthesized speech dataset can be generated using relatively few spoken words.

The method 1800 of FIG. 18 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1800 of FIG. 18 may be performed by a processor that executes instructions, such as described with reference to FIG. 19.

Figure 19:
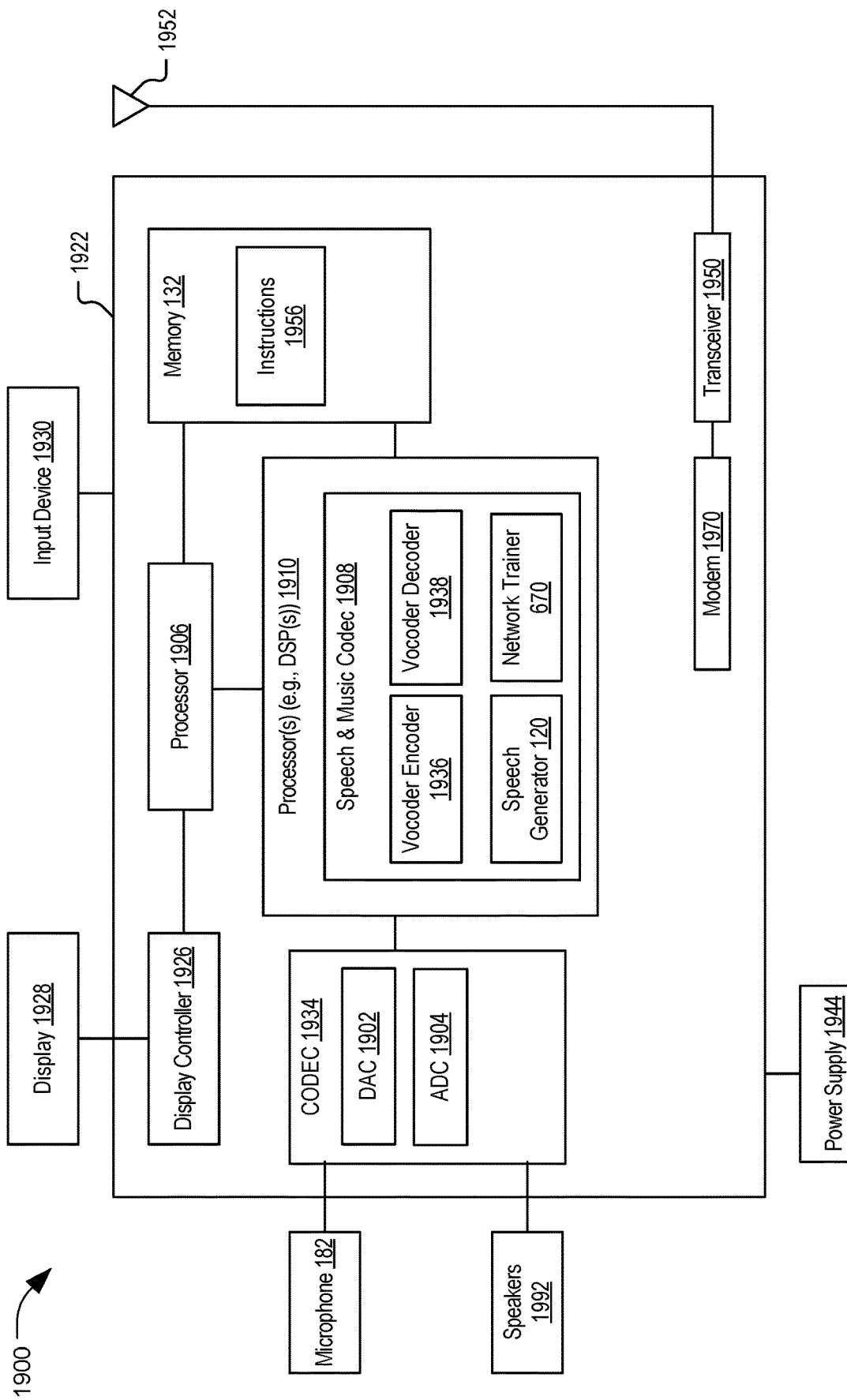
FIG. 19 is a block diagram of a particular illustrative example of a device that is operable to generate synthesized speech, in accordance with some examples of the present disclosure.

Referring to FIG. 19, a block diagram of a particular illustrative implementation of a device is depicted and generally designated 1900. In various implementations, the device 1900 may have more or fewer components than illustrated in FIG. 19. In an illustrative implementation, the device 1900 may correspond to the device 102. In an illustrative implementation, the device 1900 may perform one or more operations described with reference to FIGS. 1-18.

In a particular implementation, the device 1900 includes a processor 1906 (e.g., a central processing unit (CPU)). The device 1900 may include one or more additional processors 1910 (e.g., one or more DSPs). In a particular aspect, the one or more processors 190 of FIG. 1 correspond to the processor 1906, the processors 1910, or a combination thereof. The processors 1910 may include a speech and music coder-decoder (CODEC) 1908 that includes a voice coder ("vocoder") encoder 1936, a vocoder decoder 1938, the speech generator 120, the network trainer 670, or a combination thereof.

The device 1900 may include the memory 132 and a CODEC 1934. The memory 132 may include instructions 1956, that are executable by the one or more additional processors 1910 (or the processor 1906) to implement the functionality described with reference to the speech generator 120, the network trainer 670, or both. The device 1900 may include a modem 1970 coupled, via a transceiver 1950, to an antenna 1952.

The device 1900 may include a display 1928 coupled to a display controller 1926. A speaker 1992, the microphone 182, or both may be coupled to the CODEC 1934. The CODEC 1934 may include a digital-to-analog converter (DAC) 1902, an analog-to-digital converter (ADC) 1904, or both. In a particular implementation, the CODEC 1934 may receive analog signals from the microphone 182, convert the analog signals to digital signals using the analog-to-digital converter 1904, and provide the digital signals to the speech and music codec 1908. The speech and music codec 1908 may process the digital signals, and the digital signals may further be processed by the speech generator 120. In a particular implementation, the speech and music codec 1908 may provide digital signals to the CODEC 1934. The CODEC 1934 may convert the digital signals to analog signals using the digital-to-analog converter 1902 and may provide the analog signals to the speakers 1992.

In a particular implementation, the device 1900 may be included in a system-in-package or system-on-chip device 1922. In a particular implementation, the memory 132, the processor 1906, the processors 1910, the display controller 1926, the CODEC 1934, and the modem 1970 are included in a system-in-package or system-on-chip device 1922. In a particular implementation, an input device 1930 and a power supply 1944 are coupled to the system-on-chip device 1922. Moreover, in a particular implementation, as illustrated in FIG. 19, the display 1928, the input device 1930, the speaker 1992, the microphone 182, the antenna 1952, and the power supply 1944 are external to the system-on-chip device 1922. In a particular implementation, each of the display 1928, the input device 1930, the speaker 1992, the microphone 182, the antenna 1952, and the power supply 1944 may be coupled to a component of the system-on-chip device 1922, such as an interface or a controller.

The device 1900 may include a virtual assistant, a home appliance, a smart device, an internet of things (IoT) device, a communication device, a headset, a vehicle, a computer, a display device, a television, a gaming console, a music player, a radio, a video player, an entertainment unit, a personal media player, a digital video player, a camera, a navigation device, a smart speaker, a speaker bar, a mobile communication device, a smart phone, a cellular phone, a laptop computer, a tablet, a personal digital assistant, a digital video disc (DVD) player, a tuner, an augmented reality headset, a virtual reality headset, an aerial vehicle, a home automation system, a voice-activated device, a wireless speaker and voice activated device, a portable electronic device, a car, a vehicle, a computing device, a virtual reality (VR) device, a base station, a mobile device, or any combination thereof.

In conjunction with the described implementations, an apparatus includes means for receiving one or more control parameters indicating target speech characteristics. For example, the means for receiving include the style data generator 126, the speech generator 120, the one or more processors 190, the device 102 of FIG. 1, the transceiver 1950, the modem 1970, the input device 1930, an input interface of the device 1900, one or more other circuits or components configured to receive one or more control parameters, or any combination thereof.

The apparatus also includes means for processing, using a multi-encoder, an input representation of speech based on the one or more control parameters to generate encoded data corresponding to an audio signal that represents a version of the speech based on the target speech characteristics. For example, the means for processing include the multi-encoder 192, the multi-encoder transformer 128, the speech generator 120, the one or more processors 190, the device 102 of FIG. 1, the speech and music CODEC 1908, the processor 1910, the processor 1906, the device 1900, one or more other circuits or components configured to process the input representation of speech based on one or more control parameters, or any combination thereof.

In some implementations, a non-transitory computer-readable medium (e.g., a computer-readable storage device, such as the memory 132) includes instructions (e.g., the instructions 1956) that, when executed by one or more processors (e.g., the one or more processors 1910 or the processor 1906), cause the one or more processors to receive one or more control parameters (e.g., the one or more control parameters 125) indicating target speech characteristics (e.g., the target speech characteristics 141). The instructions, when executed by the one or more processors, also cause the one or more processors to process, using a multi-encoder (e.g., the multi-encoder 192), an input representation (e.g., the input representation 123) of speech based on the one or more control parameters (e.g., the one or more control parameters 125) to generate encoded data (e.g., the encoded data 193) corresponding to an audio signal (e.g., the synthesized speech signal 131) that represents a version of the speech based on the target speech characteristics (e.g., the target speech characteristics 141).

Particular aspects of the disclosure are described below in a first set of interrelated clauses:

According to Clause 1, a device for speech generation comprises one or more processors configured to: receive one or more control parameters indicating target speech characteristics; and process, using a multi-encoder, an input representation of speech based on the one or more control parameters to generate encoded data corresponding to an audio signal that represents a version of the speech based on the target speech characteristics.

Clause 2 includes the device of Clause 1, wherein the control parameters indicate a target person whose speech characteristics are to be used, a target emotion, a target rate of speech, or a combination thereof.

Clause 3 includes the device of Clause 1 or Clause 2, wherein the one or more processors are further configured to generate merged style data based on the one or more control parameters, and wherein the merged style data is used by the multi-encoder during processing of the input representation.

Clause 4 includes the device of any of the Clauses 1 to 3, wherein the multi-encoder includes: a first encoder configured to encode the input representation independently of the one or more control parameters to generate first encoded data; and one or more second encoders configured to encode the input representation based on the one or more control parameters to generate second encoded data, wherein the encoded data includes the first encoded data and the second encoded data.

Clause 5 includes the device of Clause 4, wherein the one or more processors are further configured to: process, at a speech characteristic encoder, the input representation based on at least one of the one or more control parameters to generate an encoded input speech representation; generate, at an encoder pre-network, merged style data based at least in part on the encoded input speech representation; provide the input representation to the first encoder to generate the first encoded data; and provide the input representation and the merged style data to the one or more second encoders to generate the target second encoded data.

Clause 6 includes the device of Clause 4 or Clause 5, further comprising a multi-encoder transformer including the multi-encoder and a decoder, wherein the first encoder includes a first attention network, wherein each of the one or more second encoders includes a second attention network, and wherein the decoder includes a decoder attention network.

Clause 7 includes the device of Clause 6, wherein: the first encoder comprises: a first layer including the first attention network, wherein the first attention network corresponds to a first multi-head attention network; and a second layer including a first neural network, and each of the one or more second encoders comprises: a first layer including the second attention network, wherein the second attention network corresponds to a second multi-head attention network; and a second layer including a second neural network.

Clause 8 includes the device of any of the Clauses 4 to 7, further comprising: a decoder coupled to the multi-encoder, the decoder including a decoder network that is configured to generate output spectral data based on the first encoded data and the target second encoded data; and a speech synthesizer configured to generate, based on the output spectral data, the audio signal that represents the version of the speech based on the target speech characteristics.

Clause 9 includes the device of Clause 8, wherein the decoder network includes a decoder attention network comprising: a first multi-head attention network configured to process the first encoded data; one or more second multi-head attention networks configured to process the target second encoded data; and a combiner configured to combine outputs of the first multi-head attention network and the one or more second multi-head attention networks.

Clause 10 includes the device of Clause 9, wherein the decoder further comprises: a masked multi-head attention network coupled to an input of the decoder attention network; and a decoder neural network coupled to an output of the decoder attention network.

Clause 11 includes the device of any of Clauses 1 to 10, wherein the one or processors are further configured to: generate one or more estimated control parameters from the audio signal; and based on a comparison of the one or more control parameters and the one or more estimated control parameters, train one or more neural network weights of the multi-encoder, one or more speech modification characteristic encoders, an encoder pre-network, a decoder network, or a combination thereof.

Clause 12 includes the device of any of Clauses 1 to 11, wherein the one or more processors are further configured to: receive an input speech signal; and generate the input representation based on the input speech signal.

Clause 13 includes the device of any of Clauses 1 to 11, wherein the one or more processors are further configured to receive the input representation.

Clause 14 includes the device of any of Clauses 1 to 13, wherein the input representation includes text, mel-scale spectrograms, fundamental frequency (F0) features, or a combination thereof.

Particular aspects of the disclosure are described below in a second set of interrelated clauses:

According to Clause 15, a method of speech generation comprises: receiving, at a device, one or more control parameters indicating target speech characteristics; and processing, using a multi-encoder, an input representation of speech based on the one or more control parameters to generate encoded data corresponding to an audio signal that represents a version of the speech based on the target speech characteristics.

Clause 16 includes the method of Clause 15, wherein the control parameters indicate a target person whose speech characteristics are to be used, a target emotion, a target rate of speech, or a combination thereof.

Clause 17 includes the method of Clause 15 or Clause 16, further comprising generating, at the device, merged style data based on the one or more control parameters, wherein the merged style data is used by the multi-encoder during processing of the input representation.

Clause 18 includes the method of any of Clauses 15 to 17, further comprising: encoding, at a first encoder of the multi-encoder, the input representation independently of the one or more control parameters to generate first encoded data; and encoding, at one or more second encoders of the multi-encoder, the input representation based on the one or more control parameters to generate target second encoded data, wherein the audio signal encoded data includes is based on the first encoded data and the target second encoded data.

Clause 19 includes the method of Clause 18, further comprising: processing, at a speech characteristic encoder, the input representation based on at least one of the one or more control parameters to generate an encoded input speech representation; generating, at an encoder pre-network, merged style data based at least in part on the encoded input speech representation; provide the input representation to the first encoder to generate the first encoded data; and provide the input representation and the merged style data to the one or more second encoders to generate the target second encoded data.

Clause 20 includes the method of Clause 18, wherein the multi-encoder and a decoder are included in a multi-encoder transformer, wherein the first encoder includes a first attention network, wherein each of the one or more second encoders includes a second attention network, and wherein the decoder includes a decoder attention network.

Clause 21 includes the method of Clause 20, wherein: the first encoder comprises: a first layer including the first attention network, wherein the first attention network corresponds to a first multi-head attention network; and a second layer including a first neural network, and each of the one or more second encoders comprises: a first layer including the second attention network, wherein the second attention network corresponds to a second multi-head attention network; and a second layer including a second neural network.

Clause 22 includes the method of Clause 18, further comprising: generating, at a decoder network of a decoder, output spectral data based on the first encoded data and the target second encoded data; and generating, at a speech synthesizer and based on the output spectral data, the audio signal that represents the version of the speech based on the target speech characteristics.

Clause 23 includes the method of Clause 22, further comprising: processing the first encoded data at a first multi-head attention network of a decoder attention network, wherein the decoder network includes the decoder attention network; processing the target second encoded data at one or more second multi-head attention networks of the decoder attention network; and combining, at a combiner, outputs of the first multi-head attention network and the one or more second multi-head attention networks.

Clause 24 includes the method of any of Clauses 15 to 23, further comprising: generating, at the device, one or more estimated control parameters from the audio signal; and based on a comparison of the one or more control parameters and the one or more estimated control parameters, train one or more neural network weights of the multi-encoder, one or more speech modification characteristic encoders, an encoder pre-network, a decoder network, or a combination thereof.

Clause 25 includes the method of any of Clauses 15 to 24, further comprising: receiving an input speech signal at the device; and generating, at the device, the input representation based on the input speech signal.

Clause 26 includes the method of any of Clauses 15 to 24, further comprising receive the input representation at the device.

Particular aspects of the disclosure are described below in a third set of interrelated clauses:

According to Clause 27, a non-transitory computer-readable storage medium storing instructions that, when executed by one or more processors, causes the one or more processors to: receive one or more control parameters indicating target speech characteristics; and process, using a multi-encoder, an input representation of speech based on the one or more control parameters to generate encoded data corresponding to an audio signal that represents a version of the speech based on the target speech characteristics.

Clause 28 includes the non-transitory computer-readable storage medium of Clause 27, wherein the input representation includes text, mel-scale spectrograms, fundamental frequency (F0) features, or a combination thereof.

Particular aspects of the disclosure are described below in a fourth set of interrelated clauses:

According to Clause 29, an apparatus comprising: means for receiving one or more control parameters indicating target speech characteristics; and means for processing, using a multi-encoder, an input representation of speech based on the one or more control parameters to generate encoded data corresponding to an audio signal that represents a version of the speech based on the target speech characteristics.

Clause 30 includes the apparatus of Clause 29, wherein the means for receiving and the means for processing are integrated into at least one of a virtual assistant, a home appliance, a smart device, an internet of things (IoT) device, a communication device, a headset, a vehicle, a computer, a display device, a television, a gaming console, a music player, a radio, a video player, an entertainment unit, a personal media player, a digital video player, a camera, or a navigation device.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device for speech generation comprising:
   one or more processors configured to:
      receive an input speech signal;
      receive one or more control parameters indicating target speech characteristics;
      perform audio feature extraction on the input speech signal to generate mel-scale spectrograms, fundamental frequency (F0) features, or both, of the input speech signal; and
      process, using a multi-encoder, an input representation of speech based on the one or more control parameters to generate encoded data corresponding to an audio signal that represents a version of the speech based on the target speech characteristics, wherein the input representation of speech includes the mel-scale spectrograms, fundamental frequency (F0) features, or both, of the input speech signal.

2. The device of claim 1, wherein the one or more control parameters indicate a target person whose speech characteristics are to be used, a target emotion, a target rate of speech, or a combination thereof.

3. The device of claim 1, wherein the one or more processors are further configured to generate merged style data based on the input representation and the one or more control parameters, and wherein the merged style data is used by the multi-encoder during processing of the input representation.

4. The device of claim 1, wherein the multi-encoder includes:
   a first encoder configured to encode the input representation independently of the one or more control parameters to generate first encoded data; and one or more second encoders configured to encode the input representation based on the one or more control parameters to generate second encoded data,
wherein the encoded data includes the first encoded data and the second encoded data.

5. The device of claim 4, wherein the one or more processors are further configured to:
process, at a speech characteristic encoder, the input representation based on at least one of the one or more control parameters to generate an encoded input speech representation;
generate, at an encoder pre-network, merged style data based at least in part on the encoded input speech representation;
provide the input representation to the first encoder to generate the first encoded data; and
provide the merged style data to the one or more second encoders to generate the second encoded data.

6. The device of claim 4, further comprising a multi-encoder transformer including the multi-encoder and a decoder, wherein the first encoder includes a first attention network, wherein each of the one or more second encoders includes a second attention network, and wherein the decoder includes a decoder attention network that is distinct from the first attention network and the second attention network of each of the one or more second encoders.

7. The device of claim 6, wherein:
the first encoder comprises:
a first layer including the first attention network, wherein the first attention network corresponds to a first multi-head attention network; and
a second layer including a first neural network, and
each of the one or more second encoders comprises:
a first layer including the second attention network, wherein the second attention network corresponds to a second multi-head attention network; and
a second layer including a second neural network.

8. The device of claim 4, further comprising:
a decoder coupled to the multi-encoder, the decoder including a decoder network that is configured to generate output spectral data based on the first encoded data and the second encoded data; and
a speech synthesizer configured to generate, based on the output spectral data, the audio signal that represents the version of the speech based on the target speech characteristics.

9. The device of claim 8, wherein the decoder network includes a decoder attention network comprising:
a first multi-head attention network configured to process the first encoded data;
one or more second multi-head attention networks configured to process the second encoded data; and
a combiner configured to combine outputs of the first multi-head attention network and the one or more second multi-head attention networks.

10. The device of claim 9, wherein the decoder further comprises:
a masked multi-head attention network coupled to an input of the decoder attention network; and
a decoder neural network coupled to an output of the decoder attention network.

11. The device of claim 1, wherein the one or processors are further configured to:
generate one or more estimated control parameters from the audio signal; and
based on a comparison of the one or more control parameters and the one or more estimated control parameters, train one or more neural network weights of the multi-encoder, one or more speech characteristic encoders, an encoder pre-network, a decoder network, or a combination thereof.

12. The device of claim 1, further comprising a microphone, wherein the one or more processors are configured to receive the input speech signal via the microphone.

13. The device of claim 1, wherein the one or more processors are further configured to receive the input speech signal from a speech repository.

14. The device of claim 1, wherein the one or more processors are configured to receive an input signal that includes the input speech signal and a video signal.

15. A method of speech generation comprising:
receiving an input speech signal at a device;
receiving, at the device, one or more control parameters indicating target speech characteristics;
performing, at the device, audio feature extraction on the input speech signal to generate mel-scale spectrograms, fundamental frequency (F0) features, or both, of the input speech signal; and
processing, using a multi-encoder, an input representation of speech based on the one or more control parameters to generate encoded data corresponding to an audio signal that represents a version of the speech based on the target speech characteristics, wherein the input representation of speech includes the mel-scale spectrograms, fundamental frequency (F0) features, or both, of the input speech signal.

16. The method of claim 15, wherein the one or more control parameters indicate a target person whose speech characteristics are to be used, a target emotion, a target rate of speech, or a combination thereof.

17. The method of claim 15, further comprising generating, at the device, merged style data based on the input representation and the one or more control parameters, wherein the merged style data is used by the multi-encoder during processing of the input representation.

18. The method of claim 15, further comprising:
encoding, at a first encoder of the multi-encoder, the input representation independently of the one or more control parameters to generate first encoded data; and
encoding, at one or more second encoders of the multi-encoder, the input representation based on the one or more control parameters to generate second encoded data,
wherein the encoded data includes the first encoded data and the second encoded data.

19. The method of claim 18, further comprising:
processing, at a speech characteristic encoder, the input representation based on at least one of the one or more control parameters to generate an encoded input speech representation;
generating, at an encoder pre-network, merged style data based at least in part on the encoded input speech representation;
provide the input representation to the first encoder to generate the first encoded data; and
provide the merged style data to the one or more second encoders to generate the second encoded data.

20. The method of claim 18, wherein the multi-encoder and a decoder are included in a multi-encoder transformer, wherein the first encoder includes a first attention network, wherein each of the one or more second encoders includes a second attention network, and wherein the decoder includes a decoder attention network.

21. The method of claim 20, wherein:
the first encoder comprises:
  a first layer including the first attention network, wherein the first attention network corresponds to a first multi-head attention network; and
  a second layer including a first neural network, and
each of the one or more second encoders comprises:
  a first layer including the second attention network, wherein the second attention network corresponds to a second multi-head attention network; and
  a second layer including a second neural network.

22. The method of claim 18, further comprising:
generating, at a decoder network of a decoder, output spectral data based on the first encoded data and the second encoded data; and
generating, at a speech synthesizer and based on the output spectral data, the audio signal that represents the version of the speech based on the target speech characteristics.

23. The method of claim 22, further comprising:
processing the first encoded data at a first multi-head attention network of a decoder attention network, wherein the decoder network includes the decoder attention network;
processing the second encoded data at one or more second multi-head attention networks of the decoder attention network; and
combining, at a combiner, outputs of the first multi-head attention network and the one or more second multi-head attention networks.

24. The method of claim 15, further comprising:
generating, at the device, one or more estimated control parameters from the audio signal; and
based on a comparison of the one or more control parameters and the one or more estimated control parameters, train one or more neural network weights of the multi-encoder, one or more speech characteristic encoders, an encoder pre-network, a decoder network, or a combination thereof.

25. The method of claim 15, wherein the input speech signal is received via a microphone.

26. The method of claim 15, wherein the input speech signal is received from a speech repository.

27. A non-transitory computer-readable storage medium storing instructions that, when executed by one or more processors, cause the one or more processors to:
receive an input speech signal;
receive one or more control parameters indicating target speech characteristics;
perform audio feature extraction on the input speech signal to generate mel-scale spectrograms, fundamental frequency (F0) features, or both, of the input speech signal; and
process, using a multi-encoder, an input representation of speech based on the one or more control parameters to generate encoded data corresponding to an audio signal that represents a version of the speech based on the target speech characteristics, wherein the input representation of speech includes the mel-scale spectrograms, fundamental frequency (F0) features, or both, of the input speech signal.

28. The non-transitory computer-readable storage medium of claim 27, wherein the instructions, when executed by the one or more processors, cause the one or more processors to receive an input signal that includes the input speech signal and a video signal.

29. An apparatus comprising:
means for receiving an input speech signal;
means for receiving one or more control parameters indicating target speech characteristics;
means for performing audio feature extraction on the input speech signal to generate mel-scale spectrograms, fundamental frequency (F0) features, or both, of the input speech signal; and
means for processing, using a multi-encoder, an input representation of speech based on the one or more control parameters to generate encoded data corresponding to an audio signal that represents a version of the speech based on the target speech characteristics, wherein the input representation of speech includes the mel-scale spectrograms, fundamental frequency (F0) features, or both, of the input speech signal.

30. The apparatus of claim 29, wherein the means for receiving the input speech signal, the means for receiving the one or more control parameters, the means for performing audio feature extraction, and the means for processing the input representation are integrated into at least one of a virtual assistant, a home appliance, a smart device, an internet of things (IoT) device, a communication device, a headset, a vehicle, a computer, a display device, a television, a gaming console, a music player, a radio, a video player, an entertainment unit, a personal media player, a digital video player, a camera, or a navigation device.

* * * * *